(12) United States Patent
Kentley-Klay et al.

(10) Patent No.: US 12,722,301 B2
(45) Date of Patent: Sep. 1, 2026

(54) MULTI-FUNCTIONAL INVENTORY STORAGE AND DELIVERY SYSTEM

(71) Applicant: HYPRLABS INC., San Francisco, CA (US)

(72) Inventors: Tim Kentley-Klay, San Francisco, CA (US); Aditya Narayan, San Francisco, CA (US)

(73) Assignee: HYPRLABS INC., San Francisco, CA (US)

( * ) Notice: Subject to any disclaimer, the term of this patent is extended or adjusted under 35 U.S.C. 154(b) by 276 days.

(21) Appl. No.: 18/431,827

(22) Filed: Feb. 2, 2024

(65) Prior Publication Data

US 2024/0326258 A1 Oct. 3, 2024

Related U.S. Application Data

(60) Provisional application No. 63/524,213, filed on Jun. 29, 2023, provisional application No. 63/443,342, filed on Feb. 3, 2023.

(51) Int. Cl.
*B25J 9/16* (2006.01)
*B25J 5/00* (2006.01)
(Continued)

(52) U.S. Cl.
CPC .................................. *B25J 11/008* (2013.01)

(58) Field of Classification Search
CPC ... B25J 9/1679; B25J 5/007; B25J 9/00; B25J 9/1697; B25J 15/0019; B60P 3/007;
(Continued)

(56) References Cited

U.S. PATENT DOCUMENTS 9,958,864 B2 5/2018 Kentley-Klay et al.
10,233,021 B1 * 3/2019 Brady ................ G01C 21/3697
(Continued)

FOREIGN PATENT DOCUMENTS

AU 2015218522 A1 9/2015
CA 3192118 A1 9/2023
(Continued)

OTHER PUBLICATIONS

"XC60 Warnings from various driver support systems", Volvo Support EN-TH, accessed Jan. 5, 2024 at https://www.volvocars.com/en-th/support/car/xc60/article/a3f49dfea01e95e1c0a80151631c73d5, 6 pages.

(Continued)

*Primary Examiner* — Thomas Randazzo
(74) *Attorney, Agent, or Firm* — HAYNES BEFFEL & WOLFELD LLP; Ernest J. Beffel, Jr.; Hannah Powell

(57) ABSTRACT

The technology disclosed is directed to hyper-local provisioning and delivery of goods including a depot and a transporter. Hyper-local depots are mounted above transit paths (e.g., sidewalk, parking lot, road) or on the side of or inside a building. The depots store and charge transporters, which provide robotic delivery. The depots can load transporters with goods, deploy them out of the depot for delivery and retract them upon completion of the delivery task. Modules within the depot can store inventories for delivery and beverage/food preparation devices. An example transporter includes a collapsible column and a collapsible neck attached thereto. The neck supports a handle for carrying a package and a head with a radar and a camera positioned thereon. The transporter is transformable among a compact mode, a first extended position and a cruise mode.

18 Claims, 16 Drawing Sheets

(51) Int. Cl.

| | |
|---|---|
| ***B25J 9/00*** | (2006.01) |
| ***B25J 11/00*** | (2006.01) |
| ***B25J 15/00*** | (2006.01) |
| ***B60P 3/00*** | (2006.01) |
| ***B60W 60/00*** | (2020.01) |
| ***G06N 20/00*** | (2019.01) |
| ***G06Q 10/087*** | (2023.01) |
| ***G06Q 10/40*** | (2026.01) |

(58) Field of Classification Search

CPC ........ B60W 60/0025; B60W 60/00256; G05D 1/0223; G06N 20/00; G06N 3/008; G06Q 10/087; G06Q 10/40; B60L 53/80; Y10S 901/01; Y02T 10/70; Y02T 10/707

See application file for complete search history.

(56) References Cited

U.S. PATENT DOCUMENTS

| | | | | |
|---|---|---|---|---|
| 10,248,119 | B2 | 4/2019 | Kentley-Klay et al. | |
| 10,259,649 | B2 | 4/2019 | Raizer | |
| 10,442,443 | B1 | 10/2019 | Li et al. | |
| 10,551,851 | B2 * | 2/2020 | Yu | B60P 3/007 |
| 11,016,495 | B2 | 5/2021 | Palanisamy et al. | |
| 11,188,821 | B1 | 11/2021 | Kalakrishnan et al. | |
| 11,215,999 | B2 | 1/2022 | Uvarov et al. | |
| 11,312,001 | B2 * | 4/2022 | Theobald | B25J 9/00 |
| 11,351,987 | B2 | 6/2022 | Cormack et al. | |
| 11,416,804 | B2 * | 8/2022 | Heinla | G06Q 10/083 |
| 11,565,715 | B2 | 1/2023 | Bansal et al. | |
| 11,628,855 | B1 | 4/2023 | Pradhan et al. | |
| 11,675,349 | B2 | 6/2023 | Austria et al. | |
| 11,769,318 | B2 | 9/2023 | Frtunikj et al. | |
| 12,106,611 | B2 | 10/2024 | Wehinger et al. | |
| 12,175,767 | B2 | 12/2024 | Yu et al. | |
| 12,333,389 | B2 | 6/2025 | Zhu et al. | |
| 12,488,241 | B2 | 12/2025 | Muller et al. | |
| 2006/0168587 | A1 | 7/2006 | Aslam-Mir | |
| 2015/0149302 | A1 | 5/2015 | Parker | |
| 2015/0348141 | A1 | 12/2015 | Parker | |
| 2016/0082840 | A1 | 3/2016 | Yoshida et al. | |
| 2016/0096272 | A1 | 4/2016 | Smith et al. | |
| 2018/0232839 | A1 | 8/2018 | Heinla et al. | |
| 2019/0101917 | A1 | 4/2019 | Yao et al. | |
| 2019/0101927 | A1 | 4/2019 | Zhao et al. | |
| 2019/0377349 | A1 * | 12/2019 | van der Merwe | G05D 1/0212 |
| 2019/0384303 | A1 | 12/2019 | Muller et al. | |
| 2019/0389455 | A1 | 12/2019 | Reed | |
| 2020/0033869 | A1 | 1/2020 | Palanisamy et al. | |
| 2020/0164897 | A1 | 5/2020 | Krome et al. | |
| 2020/0167722 | A1 | 5/2020 | Goldberg | |
| 2020/0202540 | A1 | 6/2020 | Wang et al. | |
| 2020/0356849 | A1 | 11/2020 | Xu et al. | |
| 2020/0391731 | A1 | 12/2020 | Cheon | |
| 2021/0070309 | A1 | 3/2021 | Kodali et al. | |
| 2021/0080945 | A1 * | 3/2021 | O'Sullivan | G05D 1/0027 |
| 2021/0129860 | A1 | 5/2021 | Lee | |
| 2021/0139018 | A1 | 5/2021 | Schwindt et al. | |
| 2022/0114379 | A1 | 4/2022 | Yamazaki et al. | |
| 2022/0126864 | A1 | 4/2022 | Moustafa et al. | |
| 2022/0269943 | A1 | 8/2022 | Szatmary et al. | |
| 2023/0021034 | A1 | 1/2023 | Cui et al. | |
| 2023/0162470 | A1 | 5/2023 | Garimella et al. | |
| 2023/0176557 | A1 | 6/2023 | Cella et al. | |
| 2023/0182754 | A1 | 6/2023 | Dong et al. | |
| 2023/0202510 | A1 | 6/2023 | Kim | |
| 2023/0237378 | A1 | 7/2023 | Kranski et al. | |
| 2023/0303128 | A1 | 9/2023 | Broecker et al. | |
| 2023/0316728 | A1 | 10/2023 | Tong et al. | |
| 2024/0061104 | A1 | 2/2024 | Labusch et al. | |
| 2024/0249530 | A1 | 7/2024 | Ravi Kumar et al. | |
| 2024/0388758 | A1 | 11/2024 | Miura et al. | |
| 2024/0391482 | A1 | 11/2024 | Fox et al. | |
| 2025/0304109 | A1 | 10/2025 | Thompson | |
| 2025/0308259 | A1 | 10/2025 | Yang et al. | |

FOREIGN PATENT DOCUMENTS

| | | | | |
|---|---|---|---|---|
| CN | 109117709 | A | 1/2019 | |
| CN | 110733506 | A | 1/2020 | |
| CN | 114170488 | A | 3/2022 | |
| CN | 114194211 | A | 3/2022 | |
| CN | 114282433 | A | 4/2022 | |
| CN | 117746360 | A | 3/2024 | |
| CN | 118201743 | A | 6/2024 | |
| CN | 118486100 | A | 8/2024 | |
| CN | 120756503 | A | 10/2025 | |
| CN | 121413393 | A | 1/2026 | |
| CN | 121933043 | A | 4/2026 | |
| CN | 121963141 | A | 5/2026 | |
| DE | 102023206009 | B3 | 8/2024 | |
| DE | 102025128778 | A1 | 1/2026 | |
| DE | 102025140041 | A1 | 4/2026 | |
| EP | 4239528 | A1 | 9/2023 | |
| EP | 3789921 | B1 | 7/2025 | |
| WO | WO-2019143868 | A2 * | 7/2019 | G06Q 10/083 |
| WO | WO-2019238865 | A1 * | 12/2019 | G06Q 10/08 |
| WO | 2020065001 | A1 | 4/2020 | |
| WO | 2025007079 | | 1/2025 | |
| WO | 2025007080 | A1 | 1/2025 | |
| WO | 2026059894 | A1 | 3/2026 | |

OTHER PUBLICATIONS

Bewley et al., "Learing to Drive from Simulation without Real World Labels", Wayve AI, Dec. 2018, 8 pages.

Bhagwat, P., "Design and Analysis of a 10" Carbon Fiber Wheel for a Forumula SAE Racecar", The University of Texas at Arlington, May 2017, 105 pages.

Bojarski et al., "End to End Learning for Self-Driving Cars", NVIDIA Corporation, Apr. 2016, 9 pages.

Hawke et al., "Reimagining an autonomous vehicle", Wayve Technologies Ltd., Aug. 2021, 7 pages.

Hawke et al., "Urban Driving with Conditional Imitation Learning", Wayve AI, Dec. 2019, 8 pages.

Hu et al., "Probabilistic Future Prediction for Video Scene Understanding", Wayve AI and University of Cambridge, Jul. 2020, 22 pages.

"Road vehicles—Safety of the intended functionality", International Standard 21448, First edition, Jun. 2022, 190 pages.

Kendall et al., "Learning to Drive in a Day", Wayve AI, Sep. 2018, 7 pages.

"An Industry-first: Cracking the code on the first generalisable AI Driver", Wayve AI, Engineering, Sep. 2022, accessed Jan. 29, 2023 at https://wayve.ai/blog/industry-first-cracking-the-code-on-the-first-generalisable-ai-driver/, 14 pages.

"Dreaming about Driving", Wayve AI, Research, Sep. 2018, accessed Jan. 29, 2023 at https://wayve.ai/blog/dreaming-about-driving-imagination-rl/, 12 pages.

"Emerging Behaviour of our Driving Intelligence with End to End Deep Learning", Wayve AI, Engineering, Mar. 2021, accessed Jan. 29, 2023 at https://wayve.ai/blog/driving-intelligence-with-end-to-end-deep-learning/, 12 pages.

"Learned Urban Driving", Wayve AI, Research, Dec. 2019, accessed Jan. 29, 2023 at https://wayve.ai/blog/learned-urban-driving/, 16 pages.

"Learning to Drive like a Human", Wayve AI, Research, Apr. 2019, accessed Jan. 29, 2023 at https://wayve.ai/blog/learning-to-drive-like-a-human/, 10 pages.

"Evaluating Driving Performance in Diverse Simulated Worlds", Wayve AI, Research, Jan. 2023, accessed Jan. 29, 2023 at https://wayve.ai/blog/levaluating-driving-performance-in-diverse-simulated-worlds/, 14 pages.

"Predicting the Future from Monocular Cameras in Bird's-Eye View", Wayve AI, Research, Apr. 2021, accessed Jan. 29, 2023 at https://wayve.ai/blog/fiery-future-instance-prediction-birds-eye-view/, 16 pages.

"Wayve and DPD launch a Fleet Data Collection Pilot Program in the UK", Wayve AI, Company News, Oct. 2021, accessed Jan. 29,

(56) References Cited

OTHER PUBLICATIONS 2023 at https://wayve.ai/blog/wayve-and-dpd-launch-a-fleet-data-collection-pilot-program-in-the-uk/, 8 pages.
"Wayve to scale deep learning for autonomous vehicles with Microsoft supercomputing technologies", Wayve AI, Company News, May 2022, accessed Jan. 29, 2023 at https://wayve.ai/blog/wayve-to-scale-deep-learning-for-autonomous-vehicles-with-microsoft-supercomputing-technologies/, 9 pages.
International Search Report and Written Opinion for PCT/US2024/036289 dated Oct. 22, 2024, in 13 pages.
International Preliminary Report on Patentability for PCT/US2024/036289 dated May 30, 2025, in 58 pages.
Kocic et al., "An End-to-End Deep Neural Network for Autonomous Driving Designed for Embedded Automotive Platforms", SENSORS (2019) 19(9), in 26 pages.
Zhang et al. , "Multi-Modal Fusion Technology Based on Vehicle Information: A Survey", IEEE Transactions On Intelligent Vehicles, IEEE (2023) 8(6):3605-3619, in 15 pages.
Razi et al., "Deep learning serves traffic safety analysis: A forward-looking review", IET Intelligent Transport Systems, The Institution of Engineering and Technology, Michael Faraday House, Six Hills Way, Stevenage, Herts. SG1 2AY, UK, (2022) 17(1):22-71, in 50 pages.
Carion et al., "End-to-End Object Detection with Transformers", Jan. 1, 2020 (Jan. 1, 2020), Springer Nature Switzerland AG (2020), pp. 213-229, in 17 pages.
Nidamanuri et al., "A Progressive Review: Emerging Technologies for ADAS Driven Solutions," IEEE Transactions on Intelligent Vehicles (2022) 7(2):326-341, in 16 pages.
International Search Report and Written Opinion for PCT/US2024/036290, dated Oct. 22, 2024, in 20 pages.
Le Mero et al., "A Survey on Imitation Learning Techniques for End-to-End Autonomous Vehicles", IEEE Transactions on Intelligent Transportation Systems, (2022) 23:9, in 20 pages.
Zhang, Jiakai, "End-to-end Learning for Autonomous Driving", PHD thesis, May 1, 2019 (May 1, 2019), XP055740902, Retrieved from the Internet: URL:https://cs.nyu.edu/media/publications/zhangjiakai.pdf [retrieved on Oct. 19, 2020], in 108 pages.
Hoque et al., "ThriftyDAgger: Budget-Aware Novelty and Risk Gating for Interactive Imitation Learning", Arxiv.Org, Cornell University Library, 201 Olin Library Cornell University Ithaca, NY 14853 (2021) Sep. 17, 2021, XP091055865, in 19 pages.
Codevilla et al., "End-to-end Driving via Conditional Imitation Learning", Arxiv.Org, Cornell University Library, 201 Olin Library Cornell University Ithaca, NY 14853, (2017) Oct. 6, 2017, XP080826680, in 8 pages.
Ross et al., "Reduction of Imitation Learning and Structured Prediction to No. Regret Online Learning", Arxiv.Org, Cornell University Library, 201 Olin Library Cornell University Ithaca, NY 14853 (2010) Nov. 2, 2010, XP080460179, in 9 pages.
International Preliminary Report on Patentability for PCT/US2024/036290, dated Oct. 29, 2025, in 110 pages.
Abati et al., "Latent Space Autoregression for Novelty Detection", (2019) CVPR 2019 (arXiv:1807.01653, in 15 pgs.
Amini et al., "Variational Autoencoder for End-to-End Control of Autonomous Driving with Novelty Detection and Training Debiasing", IROS (2018) (MIT CSAIL), in 8 pages.

* cited by examiner

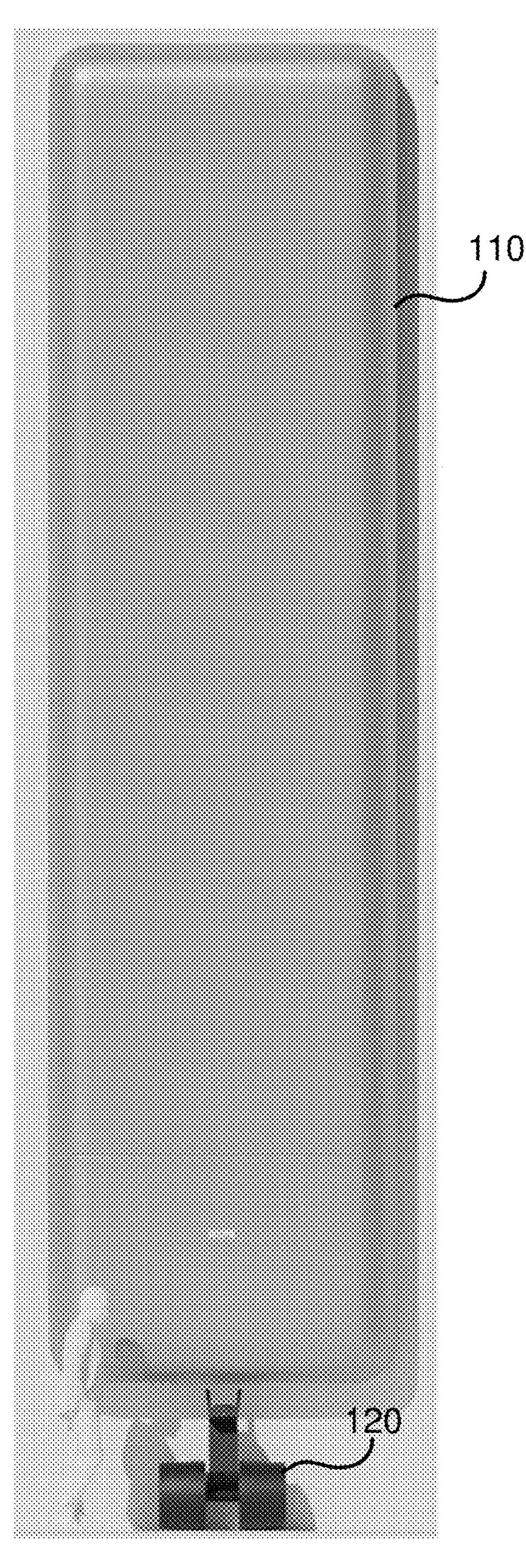
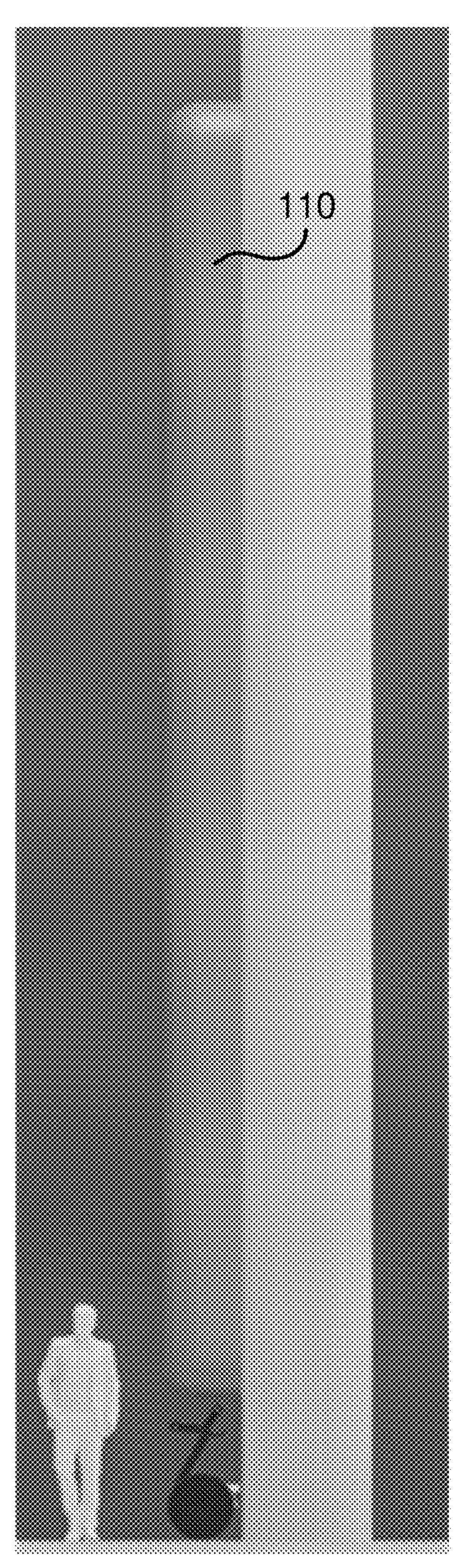
Figure 1A
Figure 1B

MULTI-FUNCTIONAL INVENTORY STORAGE AND DELIVERY SYSTEM

PRIORITY APPLICATIONS

This application claims priority to and the benefit of two provisional U.S. Patent Applications 63/443,342 filed 3 Feb. 2023, titled "Multi-Functional Inventory Storage and Delivery System" by inventors Tim Kentley-Klay and Aditya Narayan; and 63/524,213 filed 29 Jun. 2023, titled "Scalable Training and Validation for an End-To-End Autonomous Driving Model" by inventors Tim Kentley-Klay, Werner Duvaud, Aurèle Hainaut, Maxime Deloche, and Ludovic Carré. These two provisional applications are hereby incorporated by reference for all purposes.

FIELD OF THE TECHNOLOGY DISCLOSED

The technology disclosed relates to robot apparatuses and corresponding methods for storing and delivering goods. In particular, the technology disclosed relates to hyper-local provisioning and delivery of packaged goods.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

E-commerce enables customers to view goods and place orders over the Internet. In recent years, online food ordering and delivery platforms like DoorDash and Uber Eats have also thrived. The number of freight deliveries per person in America has doubled over the last decade, with almost all of that growth attributable to online purchasing. It is estimated there will be over one-third more delivery vehicles on the roads by 2030, delivering 78% more packages. It creates significant traffic congestion and environmental pollution caused by emission. Urban centers—because of their population, narrower roads, and limited parking—are forced to shoulder the burden of greater congestion on city streets due to increased online ordering and delivery demands. About half of the trucks making deliveries downtown are forced to park in unauthorized spots, blocking alleys, double parking on already congested streets or parking in bike lanes and no-parking zones.

The aggravating, costly and polluting effects of all these deliveries on traffic congestion also adversely impact customers. Expecting convenience from online ordering, instead, customers suffer from bad traffic, more smog, greenhouse gas emission and wasted resources, all of which are eventually reflected in increased delivery fees. More importantly, customers do not receive fast delivery of their orders. In online food ordering and delivery service, for example, customers have to wait for their food or pick up themselves, both of which can take a substantially long time especially in rush hours.

An opportunity arises to an efficient and convenient delivery system and method. As such, customers can receive their online orders in an efficient manner, while not adding more burden to traffic congestion.

SUMMARY

Aspects of the systems, devices and methods described herein provide a convenient and efficient approach to local delivery. In particular, the technology described herein provides hyper-local provisioning and delivery of packaged goods within five to ten to twenty minutes or less. A goal is to deliver more quickly than expected from traditional restaurant delivery services. The technology disclosed includes transporters and depots. Hyper-local depots are mounted above any transit path (e.g., sidewalk, parking lot, road) or on the side of a building. The depots store and charge transporters, which provide robotic delivery. The depots can load transporters with goods, deploy them out of the depot for delivery and retract them upon completion of the delivery task. Modules within the depot can store inventories for delivery and beverage/food preparation devices.

Upon the receipt of a customer order, a mechanical arm positioned in the depot collects inventories stored in the depot, prepares beverage, food or other customized items and packs the order into a package. A bag positioned near the base of the depot can readily be loaded by the arm and the arm can move quickly from a module to the bag. At the base, there can be an air lock for bags near bay doors through which transporters are deployed and retrieved. In one example, a bag sits on top of the air lock while it is being loaded. Various end effectors can be used with mechanical arms. The end effector is chosen based on the tasks required for various modules. End effectors can be interchangeable and could be changed within the depot, either held at a changing station or carried along with the arm and changed at multiple positions within the depot.

A hyper-local collapsible and transformable transporter can be dispatched from the depot to customers. In an office or apartment building, freshly prepared food and beverage can be delivered in minutes, more quickly than from the closest restaurant. Alternatively, the transporters can be dispatched to restaurants, pharmacies, or other goods suppliers for picking up packages and delivering them to customers. In this utilization, hyper-local transporters are an alternative to human delivery services for neighborhood diners and could save us all the time of waiting in a line at the pharmacy.

An example transporter includes a collapsible column and a collapsible neck attached thereto. Linear actuators or screws can be used to collapse or expand these components. Extruded plastic or aluminum or fiber reinforced plastics can be used for collapsible components. The collapsible neck supports a head and a handle for carrying a package. In some implementations, the handle is implemented as a boom arm configured to pick up and drop the package. The boom arm operates via an electric motor that causes the boom arm to drop down to pick up a package, raise up to carry the package, and drop down again to drop the package. While the transporter is holding the package, a handle or similar carrying structure of the package can be sandwiched between the boom arm and a clamp to secure the package. The transporter further includes a mudflap attached to the collapsible column for supporting the package. Alternatively, the wheels can be separated far enough for the package to rest between the wheels without a mudflap to support the package. The package can be oriented so that it fits between the wheels. Where there is not a mudflap, a kickstand can be useful to keep the transporter stably upright, for instance is the boom arm extends to drop or pick up a package. The transporter further includes at least one radar and at least one camera positioned on the head. The radar can be replaced or supplemented by an optical sensor such as a LiDAR, though the optical sensor may not have as wide an angle of view as a radar. Use of more than one camera and radar improves coverage while avoiding blind spots. The transporter further includes flange wheels attached at opposing ends of the collapsible column and motorized drives for applying torque to the flange wheels. The transporter is transformable among a compact position, a first extended position and a second extended position. In the compact position, the column is fully collapsed, and the neck is positioned inside rims of the flange wheels. In the first extended position, the column is partially collapsed. In the second extended or cruise position, the column and the neck are extended, and the neck extends above the flange wheels.

The hyper-local provisioning and delivery of online orders using depots and transporters described provides various advantages. The multi-functional and scalable depots can be mounted anywhere in and outside of buildings, storing inventories and transporters in proximity to customers. Compared to remote fulfillment centers that require trucks for goods delivery, depots can effectively take delivery vehicles off roads, reduce congestions and parking demand as well as gas emission. The food and beverage storage/preparation devices and indoor gardens and local delivery by transporters allow customers to enjoy freshly-made cold/hot food and groceries a few minutes after placing an online order. With the efficiency brought by the hyper-local provisioning and delivery, customers no longer need to wait in a long line for morning coffee, rush to grocery stores or restaurants after work or drive to convenient stores or pharmacies in the midnight for any urgency that they may encounter.

BRIEF DESCRIPTION OF THE DRAWINGS

The color drawings also may be available in PAIR via the Supplemental Content tab. In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

FIGS. 1A, 1B, 1C, 1D and 1E depict examples of depot mounted on a sidewall of a building and examples of transporters in accordance with implementations of the present disclosure. Alternatively, the depot can be free standing.

DETAILED DESCRIPTION

Figures 1C, 1D, 1E:
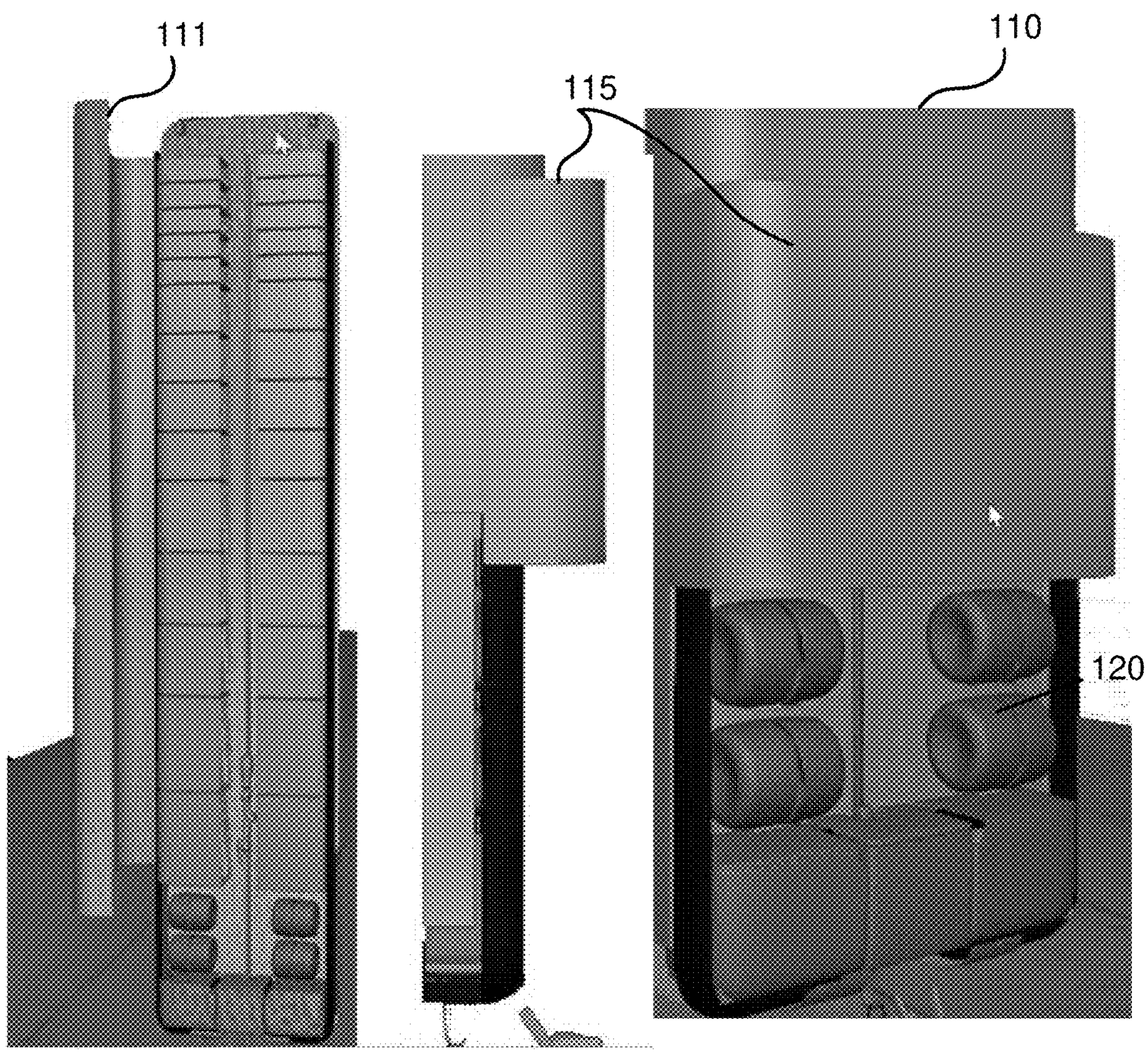

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Depot

FIGS. 1A and 1B depict examples of a depot mounted on a sidewall of a building and examples of transporters. As illustrated, the depot 110 can be a mounted above any transit path, such as a sidewalk, parking lot or road. The depot can also be mounted on the side of a building. In an office or apartment building, the depot can match the ceiling height of a room holding it. A transporter 120 is shown on the ground beneath the depots 110. In one implementation, the transporter 120 is deployed out of the depots for package delivery. After the transporter 120 completes the delivery task, it transports back to the depot 110 where it can be retrieved, recharged and/or reloaded.

The form factor of the depot 110 can range from small to large. The height of a depot can be in a range of approximately 8 feet to 55 feet, the width in a range of approximately 5 feet to 10 feet and the depth in a range of approximately 1 foot to 3 feet. A relatively shallow depth prevents the depot from blocking the view of pedestrians and vehicles. The various heights and widths provide flexibility in transporting, installing and maintaining the depots. For example, a mini-depot can be 9 feet high and installed indoors in an office or apartment building. A large-sized depot can be 34 to 48 feet high and installed outdoors on the side wall of a four-floor building. Alternatively, a plurality of depots can be vertically or horizontally stacked or integrated above the transit path. The depots can be easily stacked and transported using tractor-trailers.

The depot can have a shell made of stainless steel. For example, the shell of an eight-foot wide, nearly two foot deep depot can be fashioned from a bent sheet of 12 foot wide stainless steel. Corner radii of the depot can be select to avoid risk to any passersby, whether walking or carried on a bike or a motorized apparatus. For instance, a radius of 6, 9, 12 inches or more, up to 24 inches, or in a range between any two of these dimensions, could be used. Different corner designs could be used for horizontal than for vertical edges. The shell can have a mounting mechanism for attaching the shell to a sidewall. In one implementation, the shell includes at least two thermo insulation layers with vacuum or a sealed space therebetween, which allows stable interior temperature, pressure and moisture.

Doors provide access to the interior of the depot. FIGS. 1C, 1D and 1E illustrate hinged and lifting doors. One or more hinged doors 111 can provide access to modules in the depot. For a 40 foot tall depot, for instance, multiple hinged doors can be used instead of a monolithic single door. An operator or robot on a scissors jack can access the modules when hinged door(s) are opened. Modules can be replenished, serviced or switched out when the door is open in less time and with less motion than if the mechanical arm were being used to move goods through the airlock into the modules. The mechanical arm can be used during replenishment. A lifting door 115 can be used to access transporter storage, bag storage, the airlock and control electronics. Transporters can be pulled from their storage positions and serviced or replaced. Bags can be replenished, on the order of 100 bags per bag unit. An airlock door (e.g., 350 in FIGS. 3 and 4) is installed on the bottom of the shell for loading and unloading inventories and transporters. The airlock, which is discussed below, can be serviced or replaced. Electronics, for instance stowed beneath bag units, can be serviced or replaced when the lifting door 115 is open. Alternative door configurations can be substituted for those illustrated in FIGS. 1C, 1D and 1E without changing the concept of hyper-local delivery from depots 110 using transporters 120. Any type of door types commonly used for storage facilities, for example, roller doors and slide doors, can be installed and controlled by a control unit of the depot.

Figure 2:
FIG. 2 illustrates another example of depot mounted on a sidewall of a building, in accordance with implementations of the present disclosure.

FIG. 2 illustrates additional examples of depots mounted on sidewall of buildings, in accordance with implementations of the technology disclosed. The depot 110 can have an infrastructure adapted to connect an external power supply. As illustrated, the depots 110 can be mounted to the sidewall of a building with eco-friendly energy sources. The infrastructure of the depots 110 can be connected to wind power 230 and solar power 240. The infrastructure of the depots 110 can also be connected to other utilities (e.g., external water supply and drainage system) of the building that are needed for the operation of the depot.

The depot can have a ventilation system and service conduits. Air inlets and outlets are positioned on the shell. One or both rounded edges of the depot can include a chimney for exhausting hot air, for instance from cooking or hot beverage preparation modules. When the shell of the depot is mounted to the sidewall with a gap therebetween, the ventilation system can suck cool air stored in the gap into the depot via the air inlets. The edges of the depot also can include a utility race for water, steam, power and control circuits.

Figure 3A:
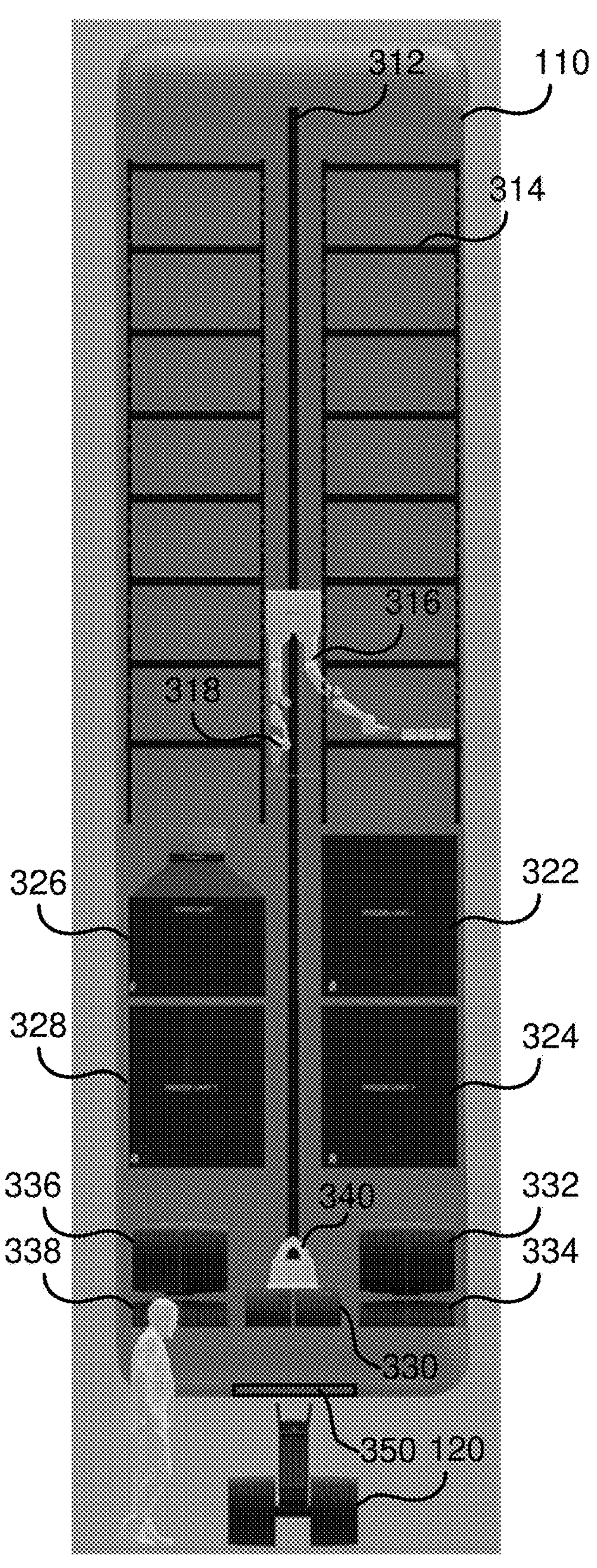
FIGS. 3A, 3B, 3C, 3D and 3E illustrates another example of depot mounted on a sidewall of a building and examples of transporters, in accordance with implementations of the present disclosure.
Figure 4A:
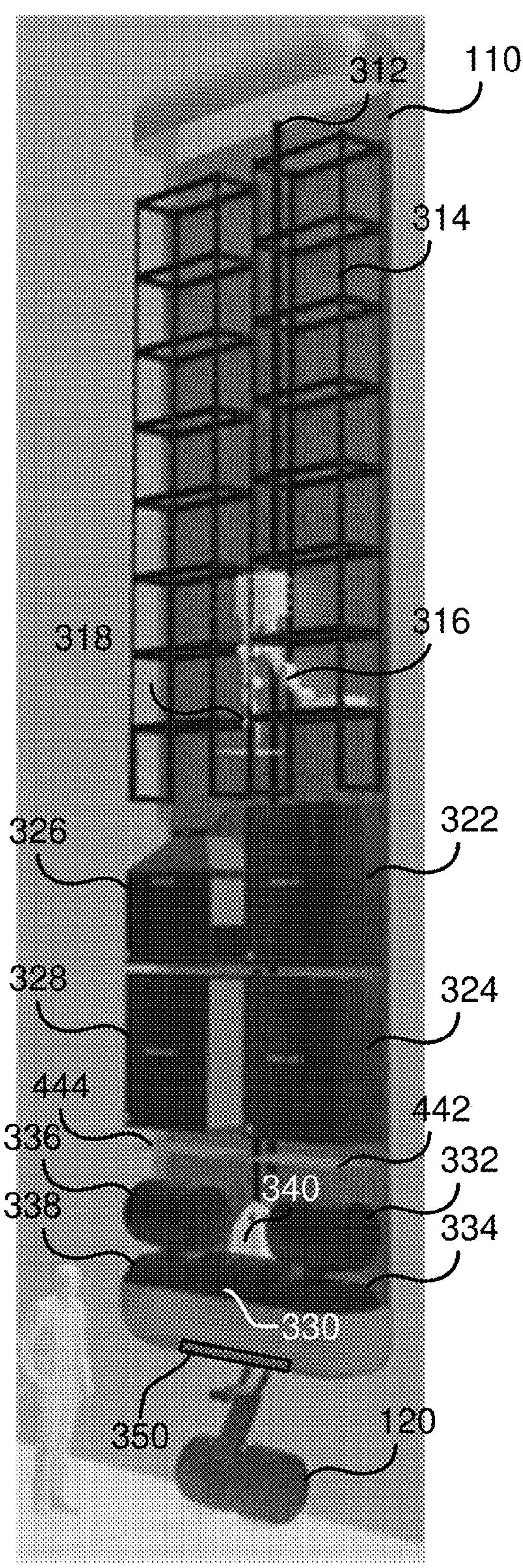
FIGS. 4A, 4B, 4C, 4D and 4E illustrates another example of depot mounted on a sidewall of a building and examples of transporters, in accordance with implementations of the present disclosure.

FIGS. 3A and 4A illustrate examples of depots mounted on a sidewall of a building. The depot 110 are mounted on the sidewall of the building. A plurality of inventory shelves 314 can be installed within the depot, on which inventories are stored. In one implementation, the shelves are used to store a range of everyday items such as snack foods, soft drinks, groceries, confectionery, tobacco products, over-the-counter drugs, toiletries, newspapers and magazines. Because the depots can be installed anywhere from indoors within office or residential building to outdoors in urban or suburban neighborhoods, the depots can effectively replace convenience stores and pharmacies. Upon receiving customer orders, the depot 110 can deploy transporters 120 out for local delivery.

The depot 110 can include a plurality of package-related modules. As illustrated, a plurality of modules 322, 324, 326 and 328 are assembled within the depot. The modules can be passive or active. A passive module could be loaded with containers of goods that the depot merely loads into a delivery package. For example, a passive module can be a refrigerator that stores food, beverage and over-the-counter drugs. An active module can custom package nutritional supplements or pharmaceuticals into doses and load them for delivery. An active module can also include at least one of a beverage preparation device, food preparation and storage devices and an indoor vegetable garden. For example, an active module can be a kitchen appliance that includes but not limited to a microwave, an oven, an electric range or cooktop, a food processor, a dishwasher, beverage processing equipment for carbonated and non-carbonated fluid, coffee maker. Based on their functions, the modules can be connected to utility infrastructures providing at least one of electrical power, heat, water and light, and ventilation systems.

As further illustrated in FIGS. 3 and 4, a linear actuator 312 with high-precision force and load carrying capabilities is vertically aligned within the shell. The linear actuator 312 can be magnetic. When the plurality of inventory shelves and modules are arranged into two columns with space therebetween, the linear actuator can be vertically aligned in the space. At least one mechanical arm 316 is attached to and movable along the linear actuator. The mechanical arm, in one example, has six to eight degrees of freedom to allow operation within the shell and modules. Examples of robot arms with many degrees of freedom are industrial robot arms provided by Kuka AB. The linear actuator and mechanical arm are controlled by the control unit of the depot. Upon receiving a control signal from the control unit, the linear actuator 312 can carry the mechanical arm(s) 316 and 318 to move to designated inventory shelves and modules. The mechanical arm 316 and 318, under control of the control unit of the depot, can perform a plurality of functions. For order preparation, the functions include grabbing goods from inventory shelves based on the customer orders, preparing customized nutritional supplements or pharmaceuticals into doses, operating active modules (e.g., operating the kitchen appliances and utensils to prepare food and beverage, harvesting vegetables from the indoor vegetable garden), packaging the orders, loading the package onto transporters for delivery and retracting/deploying transporters in and out of the depot. A separate actuator and hook 345 alternatively can be used for loading the package onto transporters for delivery and retracting/deploying transporters in and out of the depot.

Figure 4B:
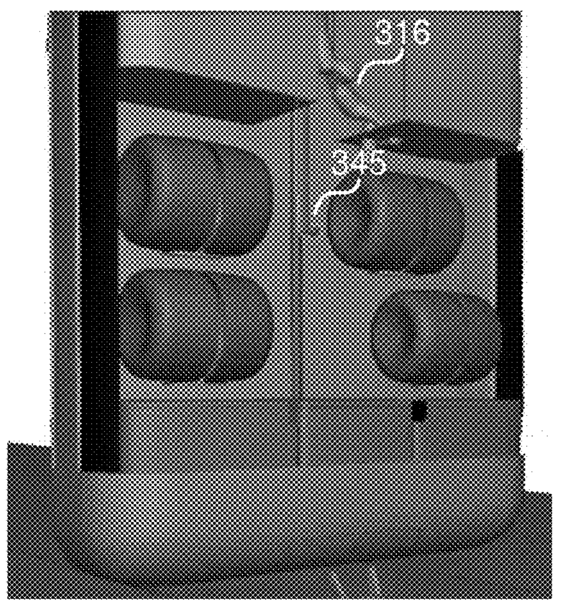

The depot 110 further includes a transporter station adapted to store and charge a plurality of transporters. As illustrated in FIGS. 3A and 4B, the transporter station is located near the bottom of the depot 110 and close to the depot door 350, which facilitates the deployment and retraction of transporters. The transporter station can be separated from the inventory shelves and modules by separating boards 442 and 444. The transporter station can hold one or more transporters collapsed in a compact position to 0.40 to 0.80 meters. As illustrated, for example, the transporter is collapsed to 0.60 meters wide and the station holds transporters (e.g., 332 and 336 in FIGS. 3A and 4A) in their compact positions. The transporters at the transporter station can be arranged into two columns, and the linear actuator is vertically aligned within space therebetween, allowing a clear path between the columns for transporters on each side. The transporter station includes a charging interface that matches a charging interface of each transporter. The interface can be inductive, capacitive or conductive. The control unit of the depot controls the charge interface of the transporter station and tracks the charging status of each transporter.

The transporter 330 is positioned in the path between the two columns for transporters. In one implementation, the transporter 330 is charged and ready to be deployed out of the depot for a delivery task. When the customer order 340 is prepared and packaged, the mechanical arm 316 moves the transporter 330 from the transporter station to the path, loads the package 340 onto the transporters 330 for delivery. When the depot door 350 opens, the mechanical arm 316 or a hook 345 deploys the transporter 330 out of the depot onto the ground. During the deployment, the transporter 330 can be transformed from a compact mode to a cruise mode for transiting on the ground. Alternatively, the mechanical arm 316 can deploy the transporter 330 out of the depot first. When the transporter 330 is on the ground and transformed to the extended position, the mechanical arm 316 can secure the package 340 onto the transporters 330. After the transporter 330 is deployed, the path between the two columns for transporters remains clear until another transporter is deployed out of the depot 110, or retracted into the depot 110.

Another transporter 120 is positioned beneath the depot 110. In one implementation, the transporter 120 completes the delivery task and transits back to the depot 110. When the depot door 350 opens, the mechanical arm 316 retracts the transporter 120 into the depot 110. During the retraction, the transporter 120 can be transformed from the extended position to the compact position for storage and charging. Transporters and the respective transformation process will be described in more detail below in accordance with FIGS. 5-8.

Figures 3B, 3C, 3D, 3E:
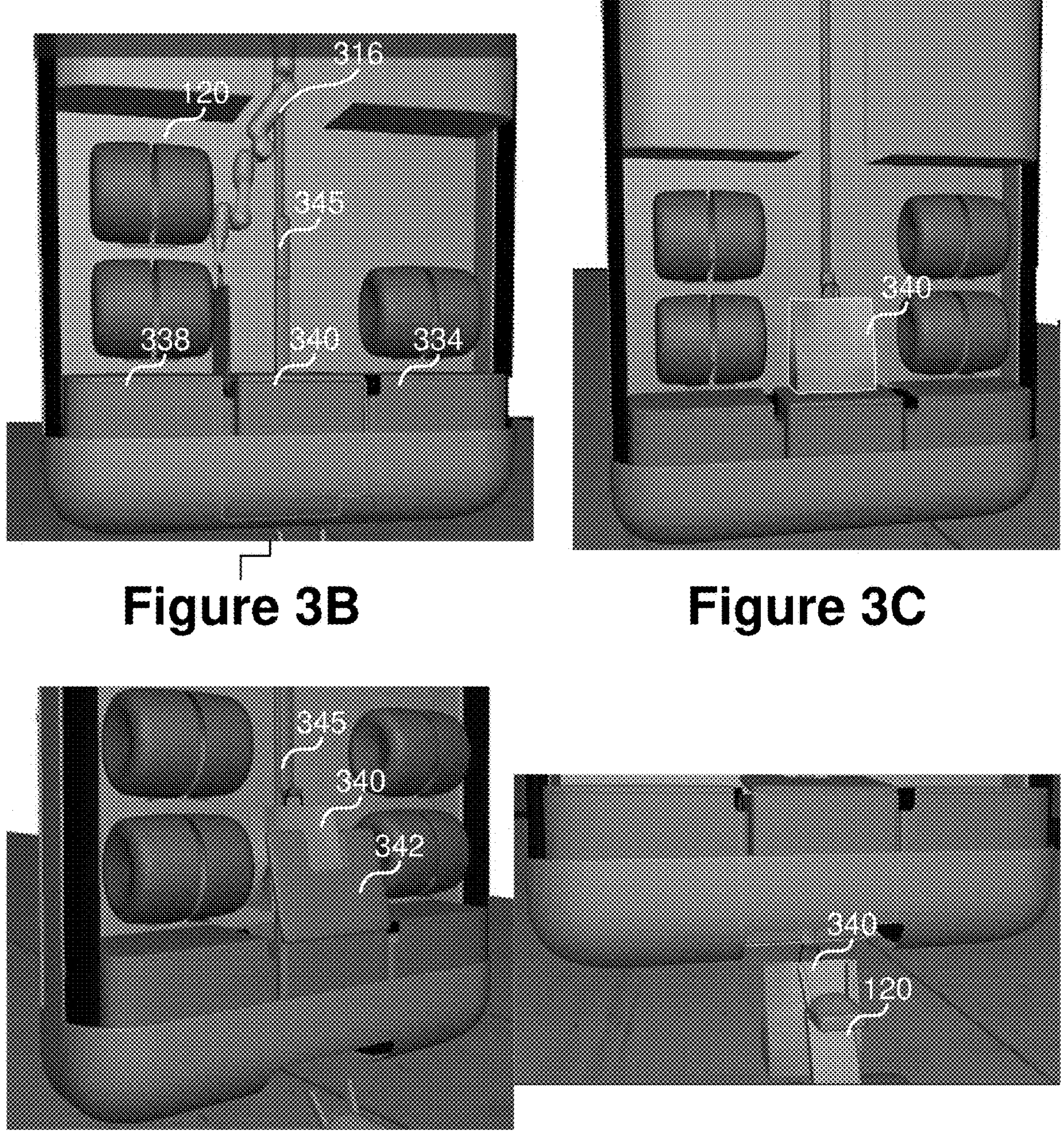

Handling of sacks as one type of delivery package is illustrated in FIGS. 3B, 3C, 3D and 3E. FIG. 3B shows the mechanical arm removing a sack 340 from one of the bins 334 and 338 below the transporters, on opposite sides of the airlock doors. Each bin of sacks can hold 50-150 sacks. The bins can be reloadable or swappable. FIG. 3C shows a package, in this case a sack 340, placed on top of the airlock door for loading and then for lowering onto the transporter. In this figure, both handles of a sack are attached to a lowering hook 345. During loading of the sack with goods for delivery, one handle of the sack could be attached to the lowering hook. FIG. 3D shows one door of the airlock opening to receive the sack. The hook 345 or a mechanical arm lowers the sack into the airlock, with the lower sliding door closed. This airlock keeps someone standing below the depot from reaching into any of the modules during raising or lowering of transporters or during loading of a package onto a transporter. While the upper door in FIG. 3D is hinged, a rolling door, like a garage door, can be used to reduce any need for movement of the package during door opening and closing. FIG. 3E shows the sack being lowered by the hook and placed onto the handle of the transporter. In this phase of loading the transporter, the upper door of the airlock is closed and the lower door, such as a pair of sliding doors or a rolling door, is open.

Figure 4C:
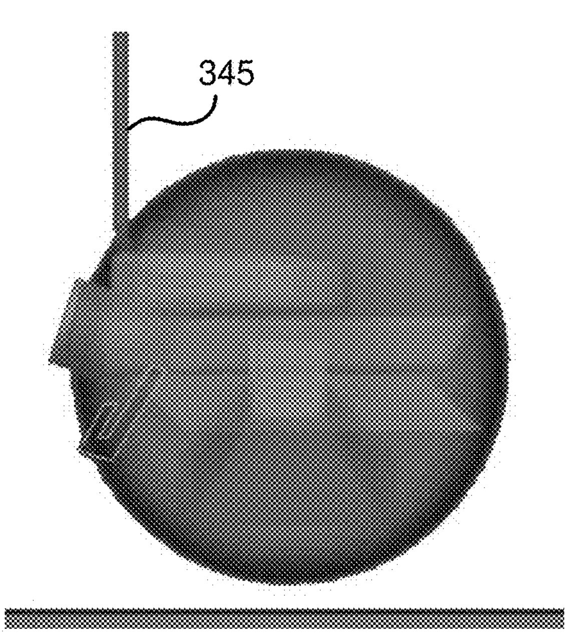
Figure 4D:
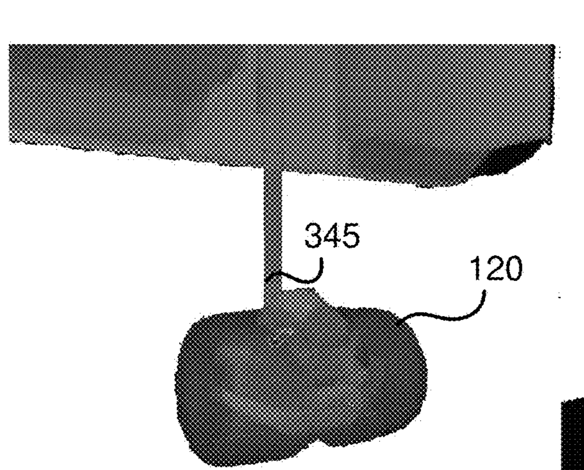
Figure 4D:
Figure 4E:
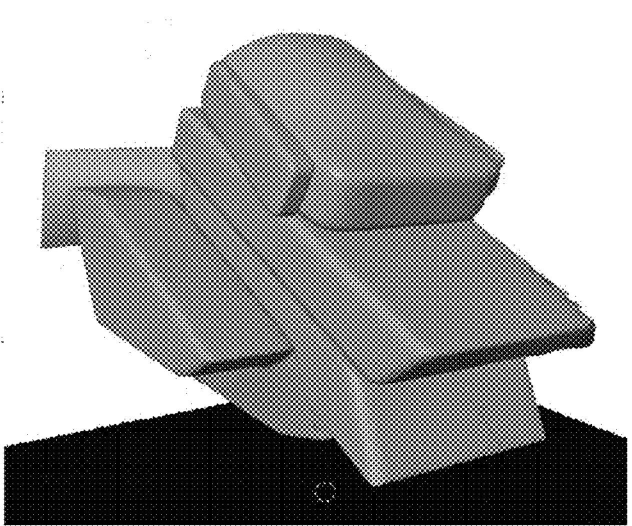

FIGS. 4B, 4C, 4D and 4E show details of a transporter in a collapsed mode and in a first extended mode, as well as engagement with the mechanical arm and hook. In FIG. 4B, an effector on the mechanical arm is engaged with a transporter, moving it between the hook and a storage position. In FIG. 4C, the hook is engaged with the transporter while the neck is fully collapsed. The hook can raise or lower a transporter in this position. In FIG. 4D, the neck is partially outside the diameter of the tires while the transporter is engaged with hook. In this figure, the tires are translucent, to allow visualization of the folded neck largely within the diameter of the tires. In FIG. 4E, the wheels and tires have been removed to show the neck in a collapsed position.

Transporter

Figure 5:
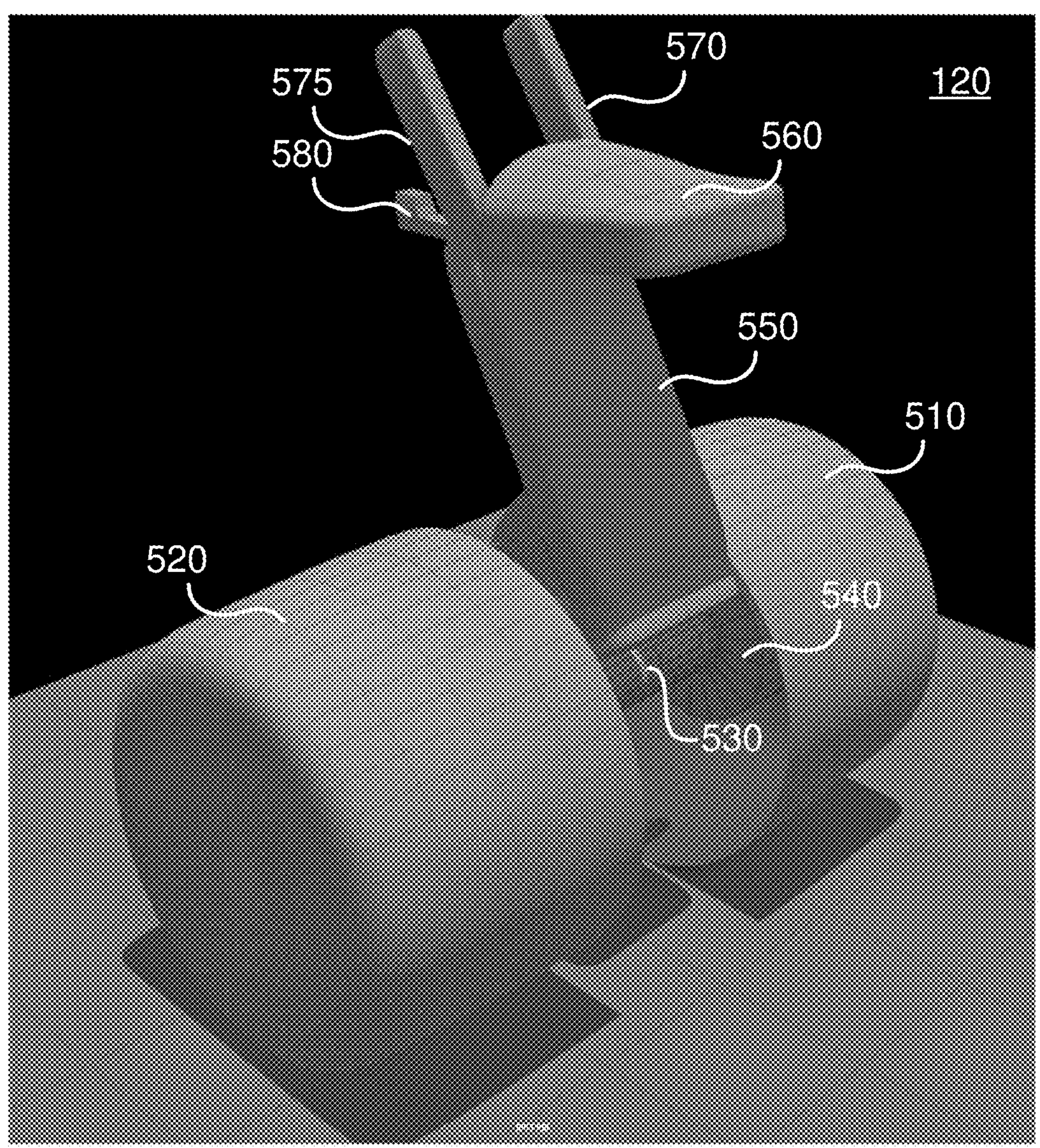
FIG. 5 illustrates an example of a transporter in a second extended or cruise position, in accordance with implementations of the present disclosure.

FIG. 5 illustrates an example of a transporter 120 in a second extended or cruise position. The transporter 120 includes a collapsible column 530 between the wheels and a collapsible neck 550 that extends above the wheels, attached to the collapsible column 530. At the cruise position, both the collapsible column 530 and collapsible neck 550 so the neck extends above the flange wheels 510/520. The rigid wheels can, for instance, be 0.3 to 0.6 meters in diameter and 0.15 to 0.3 meters wide. As illustrated, the wheels are 0.4 meters in diameter and just over 0.2 meters wide. In the cruise position for cruising, the wheels can be separated by 0.15 to 0.3 meters, allowing extension of the neck and head. It is desirable for the transporter, when in cruise mode, to be narrow enough to fit through a standard residential door that is 0.7-0.9 meters wide. The overall height of the transporter in cruise mode can be 0.7 to 1.0 meters. As illustrated, the overall height is 0.8 m. The hook illustrated is 0.65 meters high. The hook can extend 0.4 to 0.75 from the neck. Alternatively, the handle is implemented as a boom arm configured to pick up and drop the package. The boom arm operates via an electric motor that causes the boom arm to drop down to pick up a package, raise up to carry the package, and drop down again to drop the package. While the transporter is holding the package, a handle or similar carrying structure of the package can be sandwiched between the boom arm and a clamp to secure the package. The handle can be substantially as long as the neck. An example illustration of an implementation of the transporter including a boom arm is described with reference to FIGS. 9A-C below. The transporter 120 is in cruise mode. In FIG. 5, the collapsible column 530 and collapsible neck 550 are fully extended. In other words, the height and width of the transporter are maximized. Alternatively, at least one of the collapsible column 530 and collapsible neck 550 are partially extended such that the transporter 120 can transit along narrow sidewalks or paths with low ceilings.

The transporter 120 further includes a pair of flange wheels 510 and 520 with camber to reduce the contact surface between tires and roadways or sidewalks. The flange wheels 510 and 520 are at opposing ends of the collapsible column 530. The size of the flange wheels 510 and 520 can be in a range of approximately 1 foot to 3 feet. The flange wheels can be made of rigid material including injected (ABS) plastic, cloth with resin, fiberglass or carbon cloth, and resin with chopper gun fibers. A soft tire can be applied over the rigid wheels, such as a rubber, non-pneumatic tire. Each flange wheel has a hub assembly 540 that receives the collapsible column 530. When the column 530 is collapsed, the distance between the flange wheels is shortened. In one implementation, a gap (or space) exists between the collapsible column 530 and the tires of the flange wheels, such that when the transporter 120 is transformed into the compact position, the neck 550 of the transporter can be collapsed into the gap inside the tires.

Motorized drives are connected to the flange wheels and apply torque to the wheels. A control unit in the transporter is adapted to determine the torque applied to the flange wheels and control the motorized drives. A power supply (e.g., battery, solar panels) is coupled to the motorized drives.

The collapsible neck 550 supports a handle 580 and a head 560. The handle 580 can be grasped by the mechanical arm 316 to deploy the transporter 120 from the depot 110 and to retract it. The handle can, alternatively, be the end of a boom, as described above. The handle 580 can carry a package of goods for delivery. The mechanical arm 316 or a grasper can secure the package to the handle 580 before or after deploying the transporter 120 out of the depot 110. The handle 580 can include an anti-theft mechanism adapted to generate at least one of a visual alarm, an audio alarm and an electroshock. Alternatively or additionally, the handle 580 can be combined with a latch to deter theft of the package. More generally, the transporter could include a shelf or basket for carrying goods for delivery.

The head 560 can include one or more video cameras and an omni-directional radar. In some implementations, an optical sensor can be replaced or supplemented by an optical sensor such as a LiDAR, though the optical sensor may not have as wide an angle of view as a radar. The video cameras and an omni-directional radar or optical sensor can be positioned at the front of the head 560. The head 560 includes additional handles 570 and 575, illustrated as resembling a nose and cars. At least one video camera and an omni-directional radar or optical sensor can be positioned on the handles 570/575. The video cameras and omni-directional radar provides 360-degree vision and enable the transporter 120 to observe obstacles, interpret streetlights and signs and map real-time environment. An optical sensor will have a narrower field of view than an omni-directional radar. For example, when the transporter 120 transits arounds the corner of the sidewalk, the cameras and omni-directional radar or optical sensor can detect obstacles including vehicles, pedestrians, cyclists and animals passing around the corner and thus, prevent the transporter 120 from colliding with the moving as well as stationary obstacles.

The transporter further includes a navigation system adapted to navigate the transporter during delivery of the package. Many technologies have evolved for navigation, especially from development of autonomous cars. An elegant navigation algorithm can be used by hyper-local transporters, because they can be trained to understand a smaller geographical area and to react to fewer surprise situations than a car. Moreover, the speed, mass and momentum of these transporters is several orders of magnitude less than a car. For instance, a transporter may weigh 40 kg, as compared to a delivery vehicle that weighs 2000 kg. If the transporter travels at 30 kph over a short distance and the car's driver accelerates to 60 kph to cover a greater distance, the momentum of the car ($mv^2$) may be 2000× the momentum of the transporter, for the same delivery. A variety of alternatives for navigation are described.

The transporter can further include a customer recognition system adapted to recognize a customer receiving the package via the video cameras. Customer recognition, constrained by consumer privacy laws, practically depends on receiving pre-approval from a customer to use the transporter's camera to recognize a person receiving a package from the transporter. The transporter can ask the receiver to confirm that they are the person authorized to receive the package and that they have pre-approved use of face recognition. Speech and voice recognition can be used, messages can be displayed and tactile input received, or messages can be exchanged wirelessly. Upon receiving confirmation that face recognition is appropriate, the transporter can use any of the proven face recognition technologies.

Figure 6:
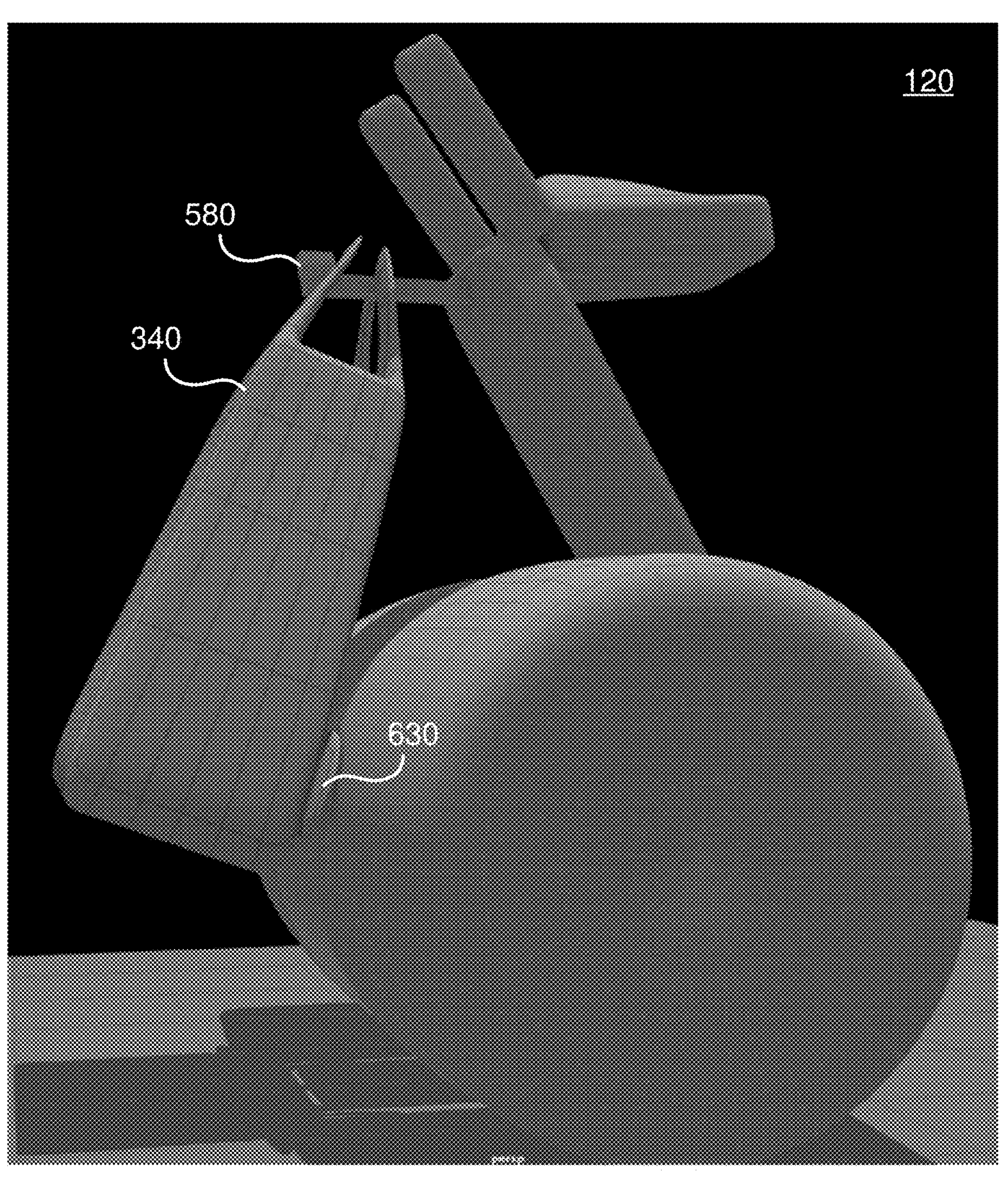
FIG. 6 illustrates another example of a transporter in a second extended position with a package secured on the transporter, in accordance with implementations of the present disclosure.

FIG. 6 illustrates another example of a transporter 120 in a second or fully extended position with a package secured on the transporter, in accordance with implementations of the present disclosure. The transporter 120 is at cruise mode with the package 340 secured on the handle 580. In some implementations, the handle can be at the end of a boom, which can be lowered to drop off or pick up a package. In a retracted position, the boom can fold into the neck and the handle can clamp shut against the head or neck. In an extended or lowered position, the handle can position a bottom of the package on a receiving surface and disengage the handle from the package. The transporter 120 also includes a multifunction mudflap 630 attached to the collapsible column. The mudflap helps support the package for delivery. By positioning between the package and the flange wheels, the mudflap 630 also prevents the package 340 from contacting the wheels. The mudflap can support the transporter 120 in a resting or stationary position, thereby reducing the energy used to keep balancing the transporter 120 with its head upright. In one example, the mudflap has enough flatness that the transporter can rest on the mudflap instead of its tires. In another example, the two tires and mudflap form a tripod on which the transporter can be stably supported. In one implementation, the mudflap 630 incorporates a charging interface for charging the transporter 120.

As an alternative to a mudflap, the wheels can be separated far enough for the package to rest between the wheels without a mudflap to support the package. When there is not a mudflap, a kickstand can be useful to keep the transporter stably upright, for instance is the boom arm extends or lowers to drop or pick up a package.

The charging interface can support conductive, inductive or capacitive charging. Alternatively, the charging interface of the transporter 120 can be positioned in the web or coupled through the tire or flange/hub of either or both flange wheels. An inductive interface, as used to charge phones, has the advantage of being resistant to dirt that is kicked up during transit. A capacitive or conductive interface also can be used.

The transporter is transformable among a compact position, a first extended position and a cruise position. The collapsible column 530 and collapsible neck 550 allow the transporter to transform among different positions. In one implementation, the collapsible column 530 is telescoping, and the collapsible neck 550 is foldable. In the cruise position as illustrated in FIGS. 5 and 6, both the column and the neck are extended above the flange wheels. At the compact position and first extended position, the column and the neck can be partially or fully collapsed as described in more detail below.

Transformation from the compact position to the first or partially extended position is under control of control unit 1032, which is described below. The control unit causes an actuator to extend the collapsible column, causing the flange wheels to move apart and expose the neck and its handles. In some implementations, at least one handle will be sufficiently exposed for the mechanical arm to deploy the transporter to the pathway below the depot. In some implementations, the neck controller causes the neck to partially unfold/extend, limited by space within the depot, to better present the handle to the mechanical arm.

Transformation from the first extended position to the compact position under control of the control unit reverses this process. The control unit causes an actuator to fold/collapse the neck so that the neck and head can be enclosed within the flange wheels. With the neck retracted, the controller causes the collapsible column to collapse, moving the flange wheels together and enclosing the neck and head. In some implementations, collapsing of the collapsible column can still leave at least the handle exposed. In some implementations, the head or handles may not fully retract inside of the flange wheels, so a handle may protrude beyond the tires or be accessible between the wheels, even when fully collapsed. This form is less compact, but involves less transforming between storage and deployment.

Transformation from the first to the cruise position is also under control of control unit 1032. The control unit causes an actuator to fully extend the collapsible column, causing the flange wheels to move further apart and making room for the neck to be fully extended. In the fully extended position some implementations, at least one handle will be sufficiently exposed for the mechanical arm to load a package onto the handle after deploying the transporter onto the pathway. A latch may secure the package to the handle after loading.

Transformation from the cruise position to the first extended position under control of the control unit reverses this process. If the transformer has returned one or more reusable packages, the mechanical arm removes the returned packages. The control unit causes an actuator to at least partially collapse/fold into the area within the diameter of flange wheels. In the so-called first extended position, collapsing of the collapsible column still leaves at least the handle exposed. The control unit causes an actuator to collapse the collapsible column, moving the flange wheels partially together. At least one handle will be sufficiently exposed for the mechanical arm to retract the transporter from the pathway into the depot. In some implementations, the neck controller leaves the neck partially unfolded/extended, limited by space available within the depot, to better present the handle to the mechanical arm.

Figure 7:
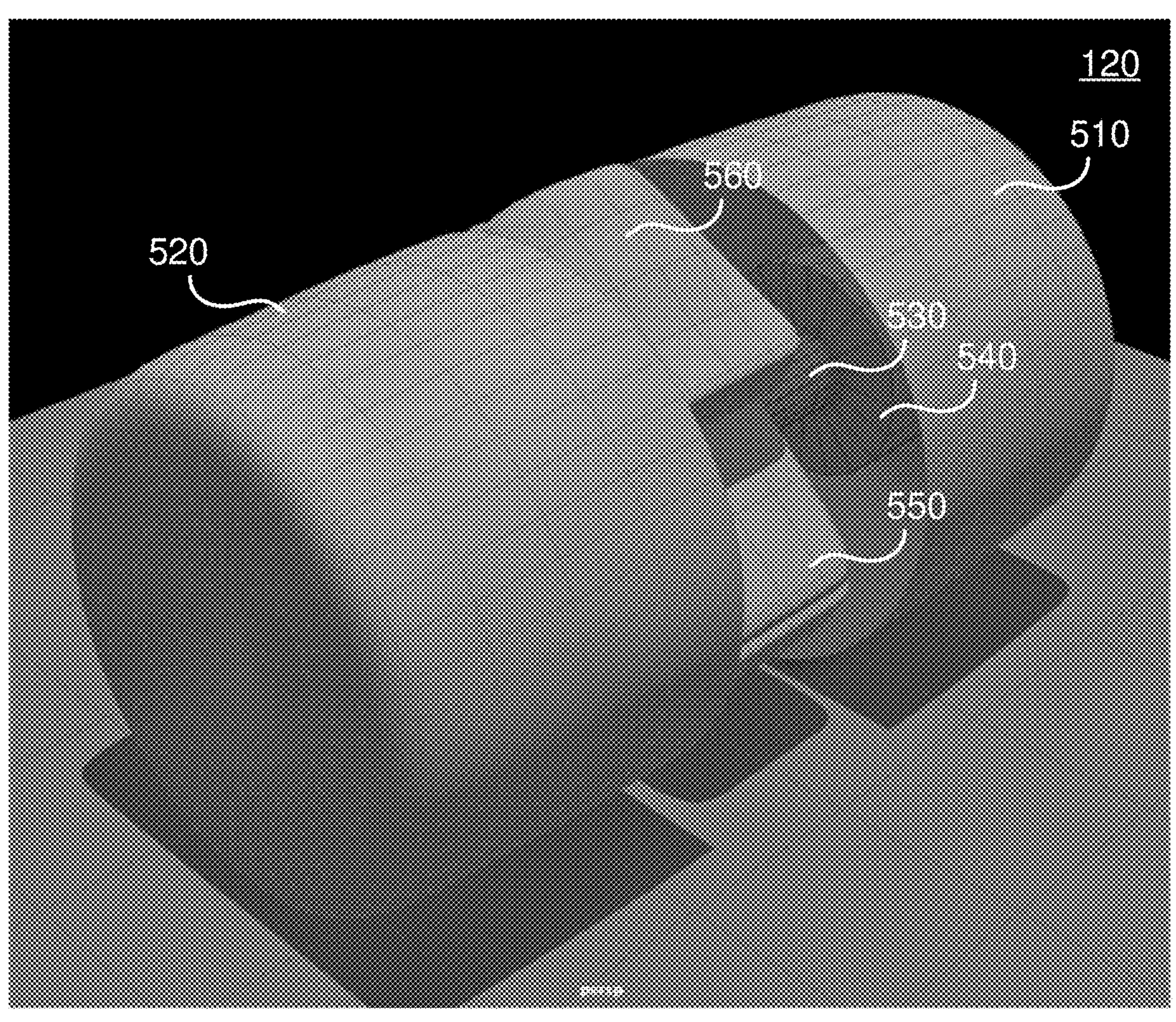
FIG. 7 illustrates an example of a transporter in a first extended position, in accordance with implementations of the present disclosure.

FIG. 7 illustrates an example of a transporter 120 in the so-called first extended position. In the first extended position, the column 530 can be partially collapsed and therefore, the distance between the flange wheels 510 and 520 is shorter than that in the cruise position. The neck 550 can be fully or partially collapsed. As illustrated, the neck 550 is folded and partially covered by the tires of the flange wheels 510 and 520. The head 560 is also folded in proximity to the neck 550 and partially covered by the tires. In one implementation, the handle on the head 560 is exposed and reachable by the mechanical arm. When the transporter 120 in the first extended position, the mechanical arm can grasp the handle and move the transporter 120 in and out of the depot through the depot door.

Figure 8:
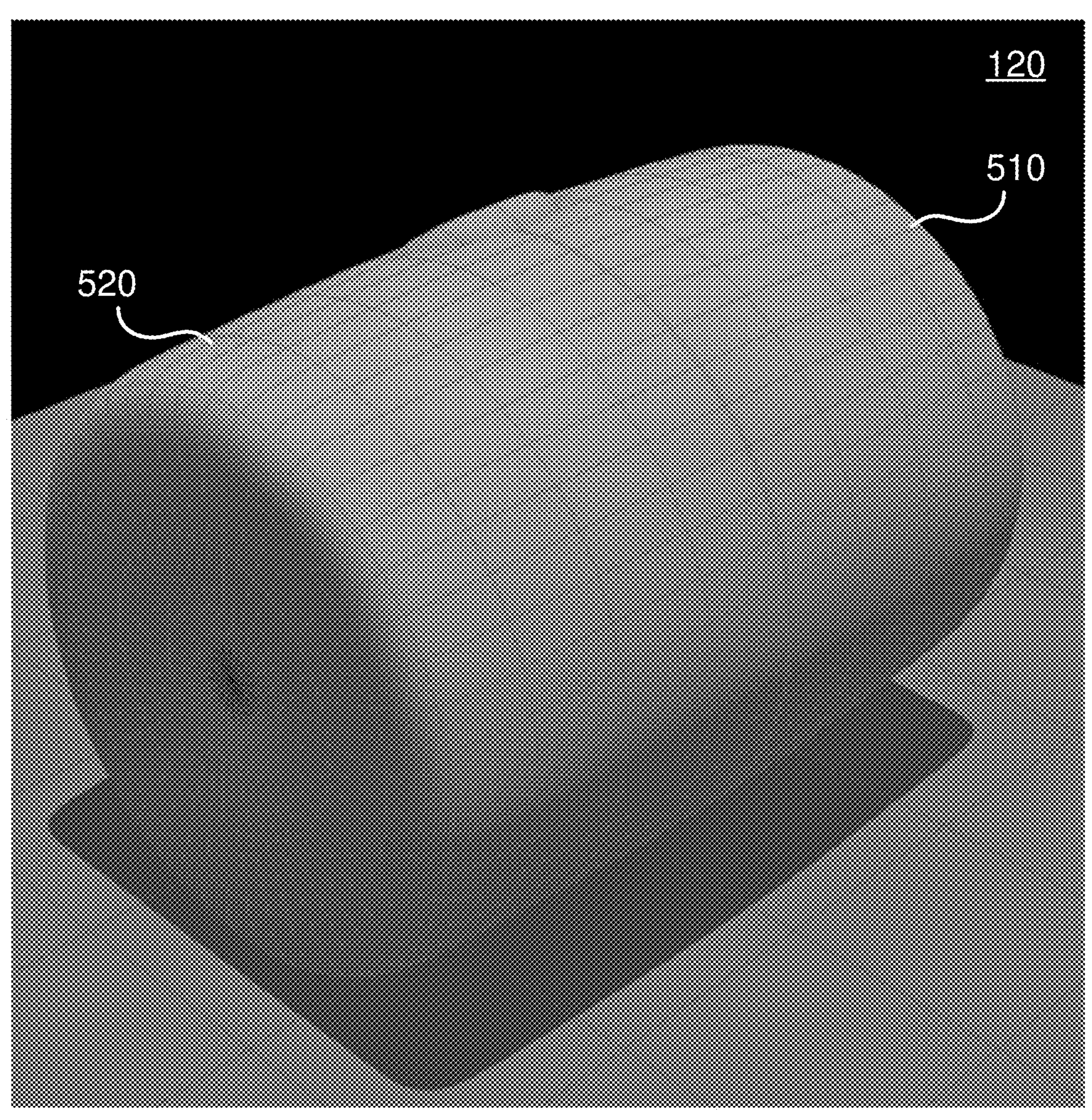
FIG. 8 illustrates an example of a transporter in a compact position, in accordance with implementations of the present disclosure.

FIG. 8 illustrates an example of a transporter 120 in a compact mode or position. In the compact position, the column of the transporter 120 is fully collapsed and the distance between the flange wheels 510 and 520 is minimized. The neck and head of the transporter 120 is positioned inside rims of the flange wheels and covered by the tires. In one implementation, the transporter 120 in the compact position is stored and charged at the transporter station in the depot. As the size of the transporter 120 is minimized in the compact position, it allows the transporter station to store a plurality of transporters.

Figure 9A:
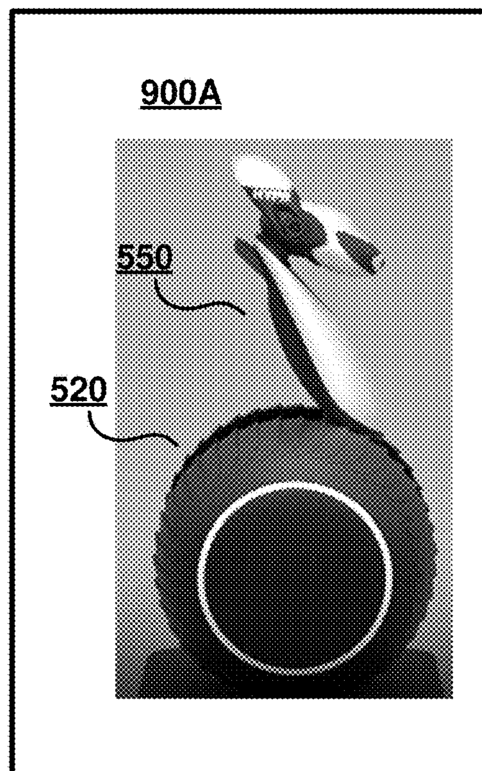
FIGS. 9A, 9B, and 9C illustrate another example of a transporter including a boom arm to secure a package, in accordance with implementations of the present disclosure.
Figure 9B:
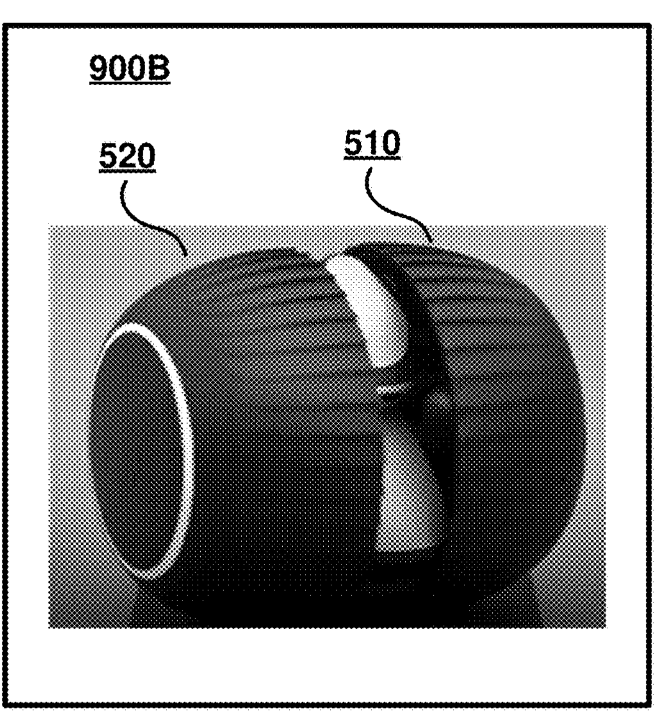
Figure 9C:
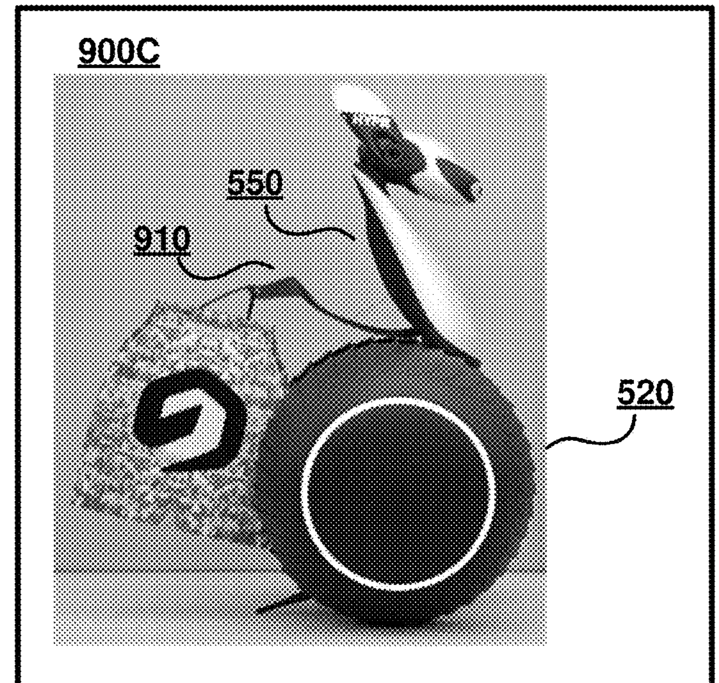

FIGS. 9A-9C illustrate an example 900A of a transporter including a boom arm 910 to secure a package, in accordance with implementations of the present disclosure. FIG. 9A illustrates an example of a transporter in an extended or cruise position. The example 900A of transporter is similar in many structural components to that of FIG. 5 (e.g., flange wheel 520 and collapsible neck 550) and these components will not be repeated for conciseness. The transporter includes a boom arm 910 configured to pick up and drop the package. The boom arm operates via an electric motor that causes the boom arm to drop down to pick up a package, raise up to carry the package, and drop down again to drop the package. While the transporter is holding the package, a handle or similar carrying structure of the package can be sandwiched between the boom arm and a clamp to secure the package. FIG. 900B shows the transporter of example 900A in the so-called first extended position such that the head and neck of the transporter are folded and partially covered by the tires of flange wheels 510 and 520. FIG. 900C shows the transporter of example 900C in the cruise position while holding a package using the boom arm 910.

Order Fulfillment and Package Delivery

Figure 10:
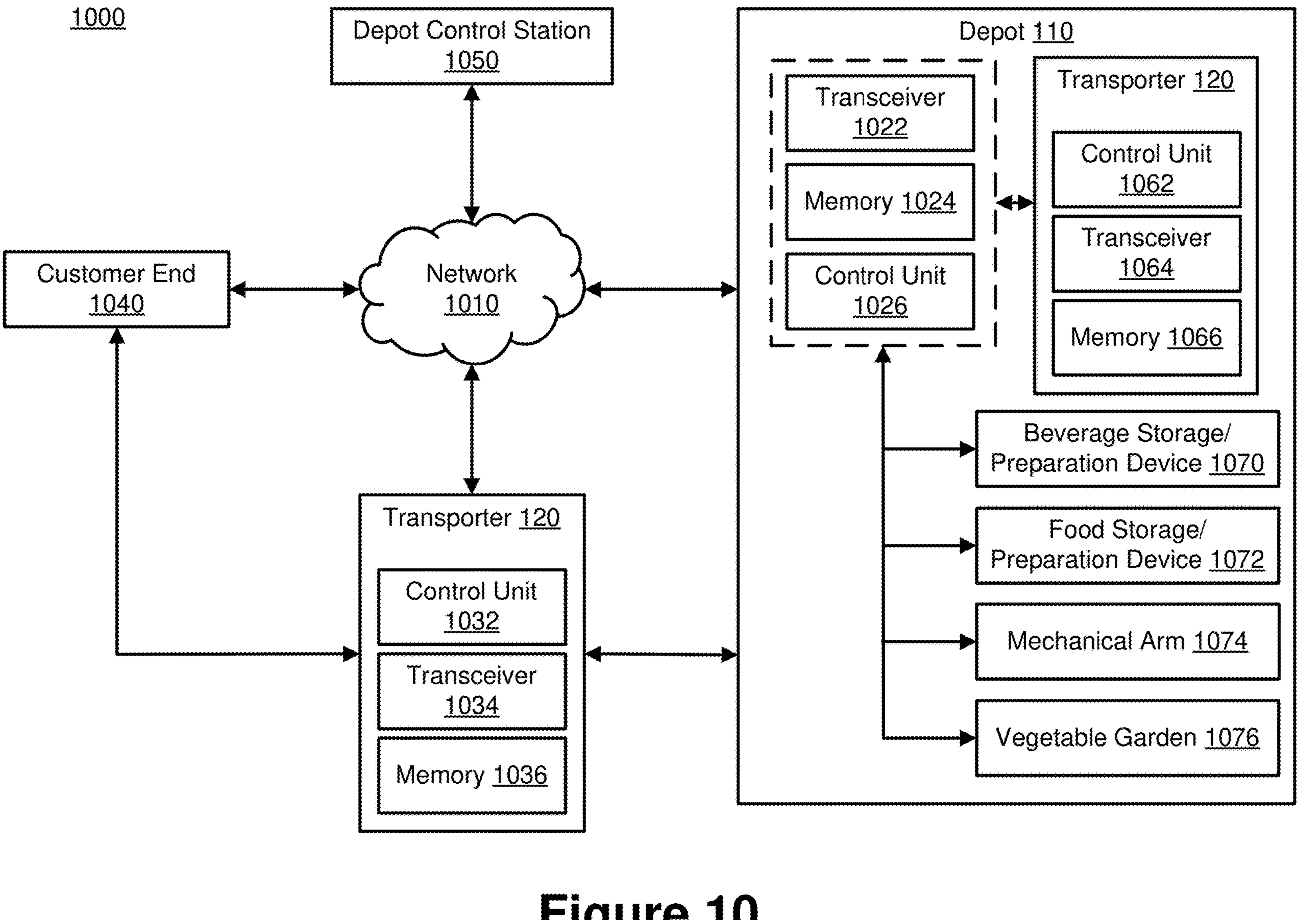
FIG. 10 is a block diagram of components of a hyper-local provisioning and delivery system including a depot and a plurality of transporters, in accordance with implementations of the present disclosure.

FIG. 10 is a block diagram of components of an example hyper-local provisioning and delivery system including a depot and a plurality of transporters. The hyper-local provisioning and delivery system 1000 includes depot 110, one or more transporters 120 in transit for package delivery, customer destination 1040 and depot control station 1050 that are connected to at least one network 1010. The wireless PHY layer of the network can include a cellular network, a low earth orbit satellite network, a wi-fi and/or other network.

The depot 110 includes a signal transceiver 1022, memory 1024 and control unit 1026. The signal transceiver 1022 can transmit signals with one or more transporters 120 stored in the transporter station and transporters 120 that are deployed out of the depot for package delivery tasks. The control unit 1026 can control the transporters 120, including controlling the transformation of the transporters and monitoring their charging status. The control unit 1026 can also control the mechanical arm 1074 for a variety of tasks including preparing and packing customer orders, operating food and beverage storage/preparation devices 1070 and 1072 as well as indoor vegetable garden 1076, deploying transporter 120 out of the depot 110 and retracting transporter 120 into the depot 110. The control unit 1026 can also control the food and beverage storage/preparation devices 1070/972, indoor vegetable garden 1076 and utility infrastructures in the modules and depot including electrical power, heat, water and light.

The depot control station 1050 manages a plurality of depots positioned in different neighborhoods. In one implementation, the depot control station 1050 can monitor the inventory storage status of each depot and send control signals to inventory fulfillment centers such that each depot can be provided with sufficient inventories in an efficient manner. The depot control station 1050 can also receive signals from or on behalf of a customer for delivery to the customer end 1040 via the network 1010 and select a depot for order fulfillment and delivery. The consideration factors for selecting the depot can include the location of the customer, the location and order fulfillment capability of each depot, for example, whether the depots have stored inventories or food/beverage preparation devices to prepare the order, and/or delivery backlog. The depot control station 1050 can also send signals via the network 1010 to the customer end 1040, for order confirmation, order preparation tracking, package delivery confirmation, customer satisfaction survey, etc. In other implementations, the customer end 1040 can send orders to other merchants (e.g., restaurants, pharmacies). The depot control station 1050 can receive the orders from other merchants and control the depot 110 to deploy a transporter for picking up the order from the merchant and delivering it to the customer.

Each of the transporters 120/960 includes a control unit 1032, a signal transceiver 1034/964 and memory 1036/966. The control unit 1032 is adapted to determine the torque applied to the flange wheels and control the motorized drives. The control unit 1032 also controls other components of the transporter, including cameras, radars, optical and/or thermo sensors, speakers, navigation system, and/or facial recognition system. The optical sensors can include one or more LiDAR sensors, such as low cost, low power optical sensors used with cell phone cameras. The signal transceiver 1034/964 receives signals from the depot 110 controlling the transporter to transport to a designated location. When the transporter 120 arrives at the designated location, the signal transceiver 1034/964 transmits a signal to the depot control station 1050 via the network 1010 or directly to the customer end 1040, indicating the arrival of the package. The customer can receive an on-approach and/or arrival notification on an end user device. The alerted customer can receive and unload the package from the transporter. When the transporter 120, upon completion of the delivery task, transits back to the depot 110, the signal transceiver 1034/964 can transmit a signal to the depot control station 1050 via the network 1010 or via a direct wireless connection with the depot 110, indicating its return.

Figure 11:
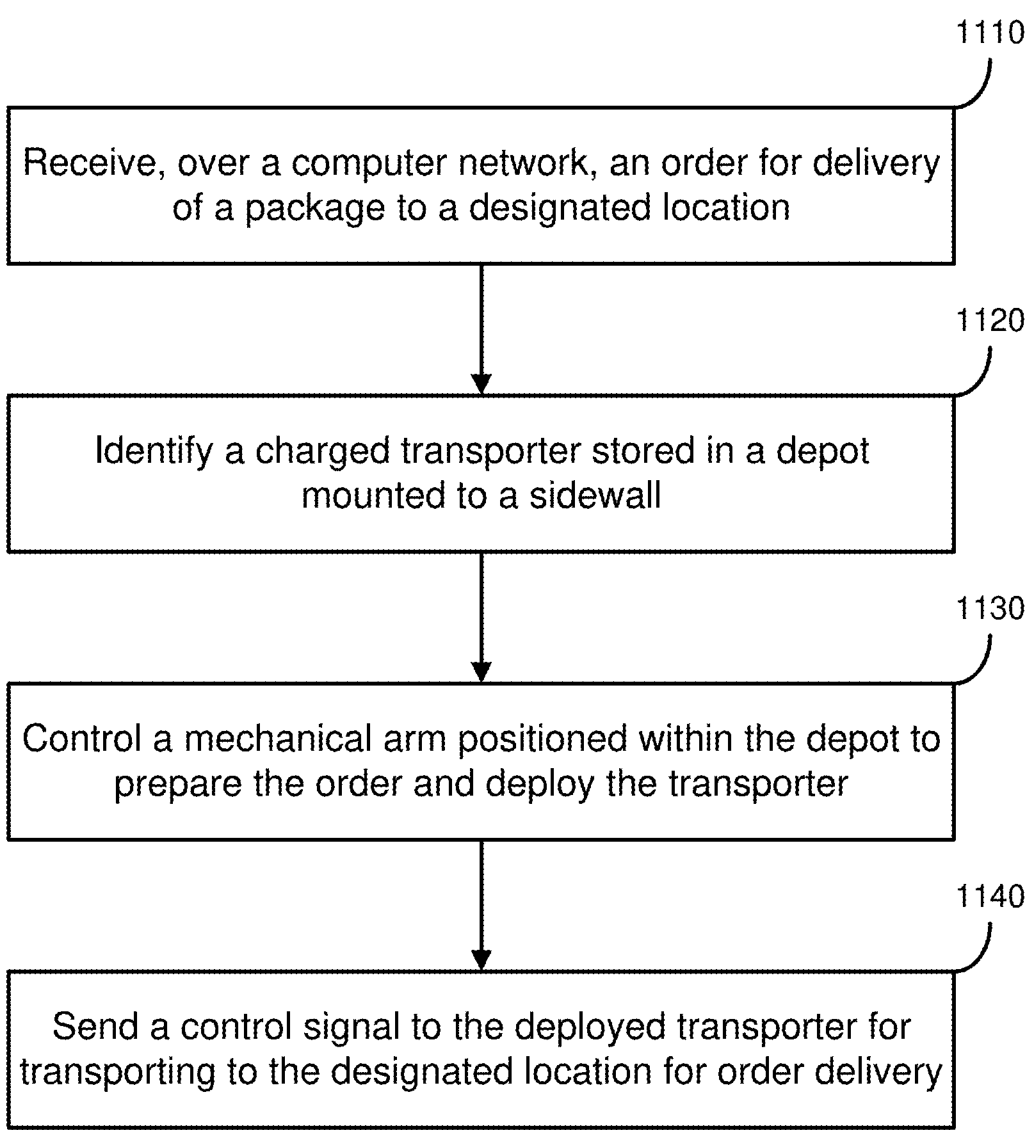
FIG. 11 is a flow chart of an example of operating the hyper-local provisioning and delivery system, in accordance with implementations of the present disclosure.

FIG. 11 is a flow chart of an example of operating the hyper-local provisioning and delivery system 1000, in accordance with implementations of the present disclosure. When a customer places an online order, the depot control station 1050 selects a designated depot 110 and sends the order information and customer information to the depot 110 over the network 1010. Upon receiving the order information (see step 1110), the depot 110 identifies a charged transporter stored in the transporter station (see step 1120). The identified transporter can be fully or partially recharged, at least sufficiently charged for the transporter to complete the delivery task and return to the depot. The depot 110 controls the mechanical arm 1074 to prepare the order and deploy the charged transporter out of the depot for delivering the order (see step 1130). The depot 110 sends a control signal to the deployed transporter for transiting to a designated location for order delivery (see step 1140).

Figure 12:
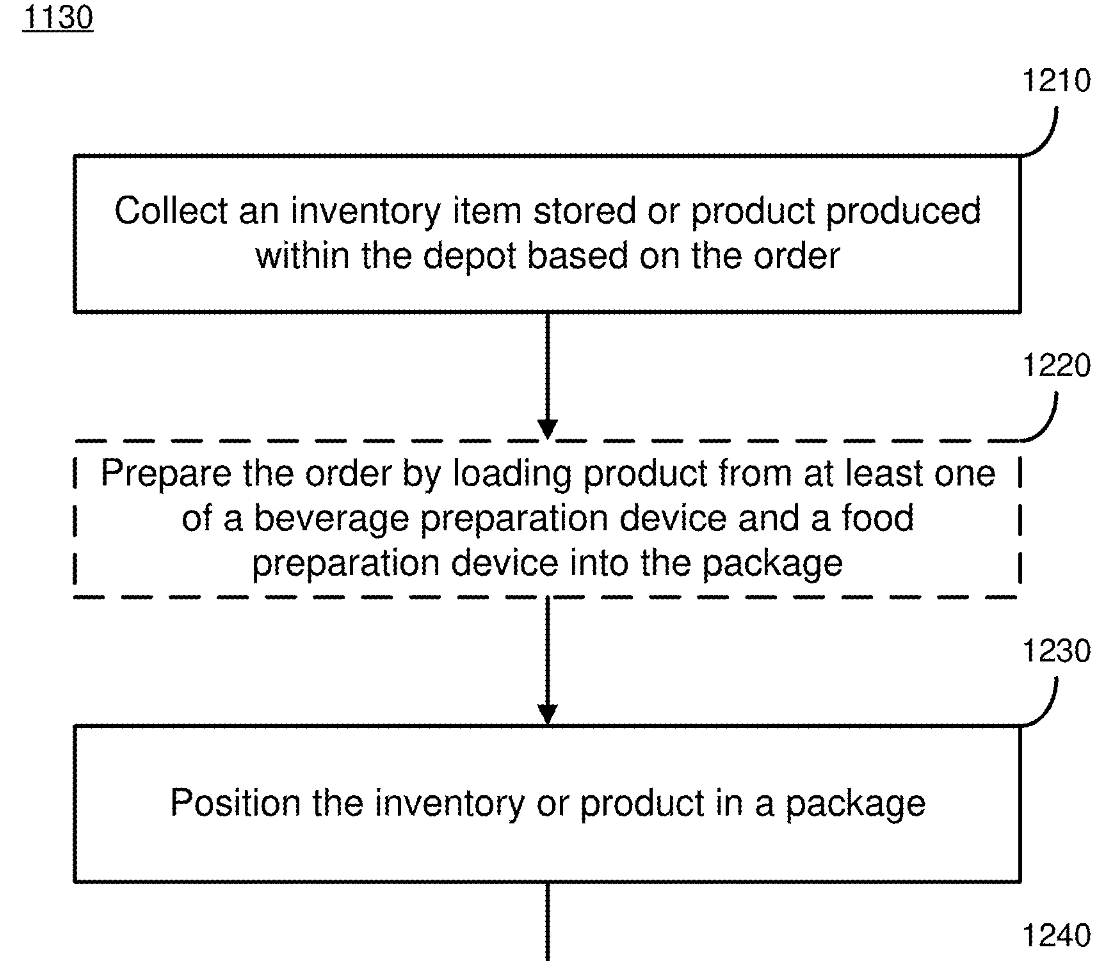
FIG. 12 is a flow chart of an example of operating the hyper-local provisioning and delivery system, in accordance with implementations of the present disclosure.

More details regarding the order preparation and transporter deployment (step 1130) are illustrated in FIG. 12, which is a flow chart of another example of operating the hyper-local provisioning and delivery system. Based on the received order information, the depot 110 can identify the location and quantity of the stored inventory item to fulfill the order. The depot 110 can control the mechanical arm 1074 to move along the linear actuator to collect the inventory item stored within the modules based on the customer order and pack the inventory into a package (see step 1210). In one implementation, each of the inventories stored in the depot 110 has a unique identifier (e.g., QR code) with respective product information and designated storage information saved in the memory 1024 of the depot 110. Upon receiving the control signal from the depot 110, the mechanical arm can move to the particular module where the inventory item is stored and collect it.

Optionally, the depot 110 can control the mechanical arm 1074 to prepare custom packages (e.g., customized doses of nutritional supplements or pharmaceuticals). At step 1220, for example, the depot 110 can control the mechanical arm 1074 to prepare the order by loading products from the food/beverage storage and preparation devices 1070/1072 into the package. The mechanical arm 1074, under control of the depot 110, can operate the beverage and food storage/preparation devices. For example, the mechanical arm 1074 can operate a coffee maker and prepare coffee. The mechanical arm 1074 can prepare hot or cold food (e.g., burger, sandwich, salad) that can be delivered while freshly made. The mechanical arm 1074 can also package the inventory or customized product, including e.g., covering the coffee or freshly prepared food with a lid, positioning the inventory or customized product into a package (see step 1230).

The depot 110 can monitor the charging status of each of the transporters stored in the transporter station. Upon receiving the customer order, the depot 110 can identify a sufficiently charged transporter stored in the transporter station. The depot 110 controls the mechanical arm 1074 to move to the transporter station to deploy a charged transporter out of the depot for delivery (see step 1240). In particular, the control unit 1026 of the depot can control the transporter to transform from the compact position to the first extended position, such that the handle of the transporter can be exposed. The mechanical arm 1074 can grasp the handle of the transporter and move the transporter from the transporter station to the clear path between the columns of stored transporters in proximity to the depot door. When the door is open, the mechanical arm 1074 can lower the transporter out of the depot. During the deployment, the transporter can be controlled to transform from the first extended position to the cruise position. When the transporter is positioned onto a transit path in the cruise position, the depot 110 can further control the mechanical arm 1074 to load the package onto the transporter (see step 1250) and control the transporter for package delivery.

When the transporter completes the delivery task and transits back to the depot, the signal transceiver of the transporter can transmit a signal to the depot indicating its approach and/or arrival. Upon receipt of the signal from the transporter, the control unit of the depot opens the door and lowers down the mechanical arm. The control unit also controls the transporter to transform from the cruise position to the first extended position, so the transporter is partially collapsed to fit the depot door. The mechanical arm moves downs through the sliding door, grasps the handle of the transporter and lifts it up into the depot.

After the transporter is retracted into the depot, the control unit further controls the mechanical arm to move the partially collapsed transporter to the transporter station. A controller can cause the transporter to transform from the first extended position to the compact position for storage and charging. A charger, such as inductive charging panel of the depot, is mated to an interface on the transporter for recharging, once the transporter is stored in the depot. Again, the interface can be part of the mudflap or part of the flange wheel or its web, either beneath the tire or at a wheel flange/hub.

Computer System

Figure 13:
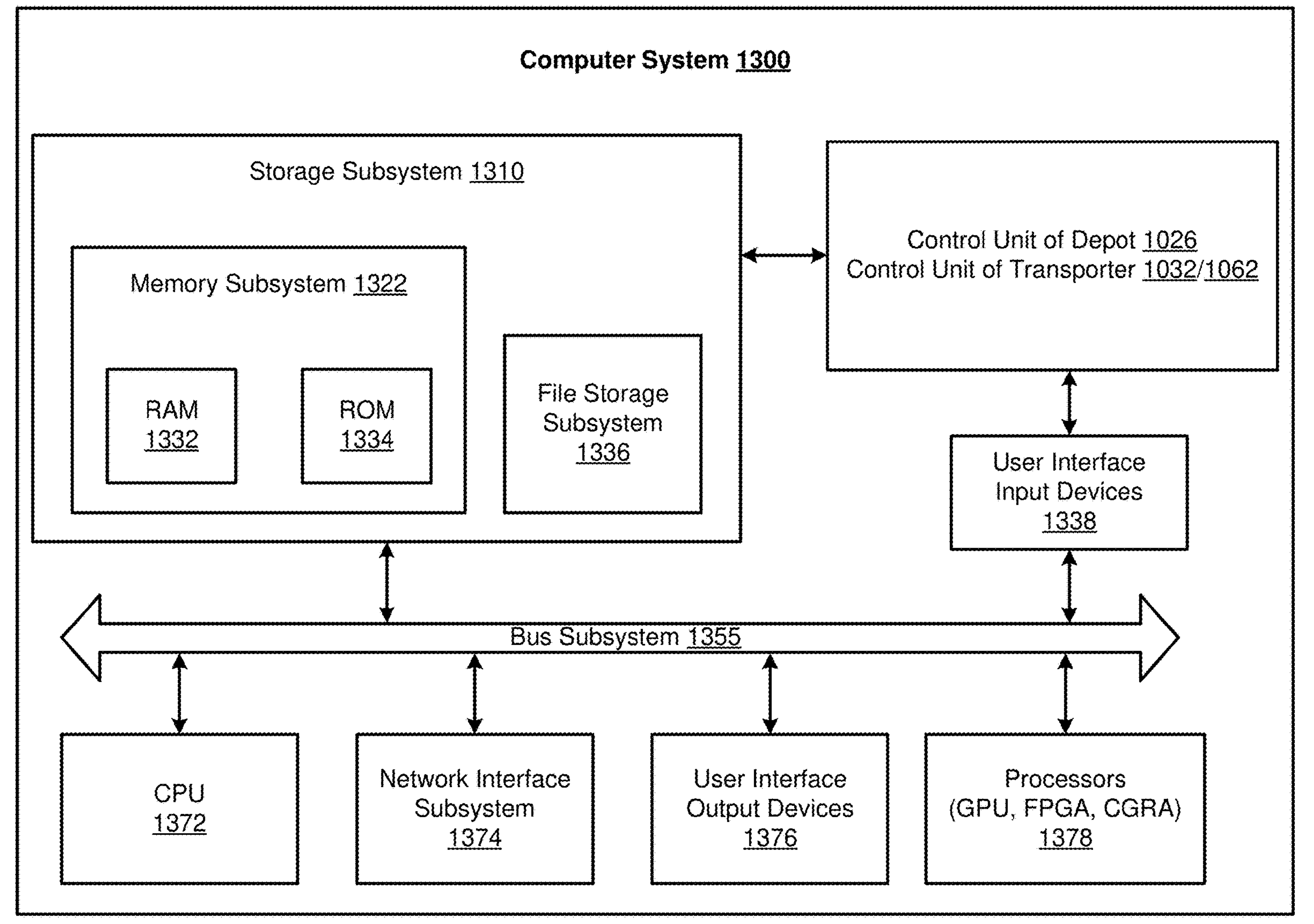
FIG. 13 illustrates a computer system that can be used to implement the technology disclosed.

FIG. 13 is a computer system 1300 that can be used to implement the technology disclosed. Computer system 1300 includes at least one central processing unit (CPU) 1372 that communicates with a number of peripheral devices via bus subsystem 1355. These peripheral devices can include a storage subsystem 1310 including, for example, memory devices and a file storage subsystem 1336, user interface input devices 1338, user interface output devices 1376, and a network interface subsystem 1374. The input and output devices allow user interaction with computer system 1300. Network interface subsystem 1374 provides an interface to outside networks, including an interface to corresponding interface devices in other computer systems.

In one implementation, the control unit 1026 of the depot and the control unit 1032 of the transporter are communicably linked to the storage subsystem 1310 and the user interface input devices 1338.

User interface input devices 1338 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1300.

User interface output devices 1376 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1300 to the user or to another machine or computer system.

Storage subsystem 1310 stores programming and data constructs that provide the functionality of some or all of the modules and methods described herein. These software modules are generally executed by processors 1378.

Processors 1378 can be graphics processing units (GPUs), field-programmable gate arrays (FPGAs), application-specific integrated circuits (ASICs), and/or coarse-grained reconfigurable architectures (CGRAs). Processors 1378 can be hosted by a deep learning cloud platform such as Google Cloud Platform™, Xilinx™, and Cirrascale™ Examples of processors 1378 include Google's Tensor Processing Unit (TPU)™, rackmount solutions like GX4 Rackmount Series™, GX15 Rackmount Series™, NVIDIA DGX-1™, Microsoft' Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 1322 used in the storage subsystem 1310 can include a number of memories including a main random access memory (RAM) 1332 for storage of instructions and data during program execution and a read only memory (ROM) 1334 in which fixed instructions are stored. A file storage subsystem 1336 can provide persistent storage for program and data files, and can include a hard disk drive, a floppy disk drive along with associated removable media, a CD-ROM drive, an optical drive, or removable media cartridges. The modules implementing the functionality of some implementations can be stored by file storage subsystem 1336 in the storage subsystem 1310, or in other machines accessible by the processor.

Bus subsystem 1355 provides a mechanism for letting the various components and subsystems of computer system 1300 communicate with each other as intended. Although bus subsystem 1355 is shown schematically as a single bus, alternative implementations of the bus subsystem can use multiple busses.

Computer system 1300 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1300 depicted in FIG. 13 is intended only as a specific example for purposes of illustrating the preferred implementations of the present invention. Many other configurations of computer system 1300 are possible having more or less components than the computer system depicted in FIG. 13.

Each of the processors or modules discussed herein may include an algorithm (e.g., instructions stored on a tangible and/or non-transitory computer readable storage medium) or sub-algorithms to perform particular processes. the control unit 1026 of the depot and the control unit 1032 of the transporter are illustrated conceptually as a collection of modules, but may be implemented utilizing any combination of dedicated hardware boards, DSPs, processors, etc. Alternatively, the control unit 1026 of the depot and the control unit 1032 of the transporter may be implemented utilizing an off-the-shelf PC with a single processor or multiple processors, with the functional operations distributed between the processors. As a further option, the modules described below may be implemented utilizing a hybrid configuration in which some modular functions are performed utilizing dedicated hardware, while the remaining modular functions are performed utilizing an off-the-shelf PC and the like. The modules also may be implemented as software modules within a processing unit.

Various processes and steps of the methods set forth can be carried out using a computer. The computer can include a processor that is part of a detection device, networked with a detection device used to obtain the data that is processed by the computer or separate from the detection device. In some implementations, information (e.g., image data) may be transmitted between components of a system disclosed herein directly or via a computer network. A local area network (LAN) or wide area network (WAN) may be a corporate computing network, including access to the Internet, to which computers and computing devices comprising the system are connected. In one implementation, the LAN conforms to the transmission control protocol/internet protocol (TCP/IP) industry standard. In some instances, the information (e.g., image data) is input to a system disclosed herein via an input device (e.g., disk drive, compact disk player, USB port etc.). In some instances, the information is received by loading the information, e.g., from a storage device such as a disk or flash drive.

A processor that is used to run an algorithm or other process set forth herein may comprise a microprocessor. The microprocessor may be any conventional general purpose single- or multi-chip microprocessor such as a Pentium™ processor made by Intel Corporation. A particularly useful computer can utilize an Intel Ivybridge dual-12 core processor, LSI raid controller, having 128 GB of RAM, and 2 TB solid state disk drive. In addition, the processor may comprise any conventional special purpose processor such as a digital signal processor or a graphics processor. The processor typically has conventional address lines, conventional data lines, and one or more conventional control lines.

Particular Implementations

In one implementation, a transporter is described that is capable of hyper-local deliveries and of stowage in a depot. The transporter described includes a collapsible column, a collapsible neck attached to the collapsible column, the neck supporting a head and a handle for carrying a package, and, optionally, a mudflap attached to the collapsible column for supporting the package and/or a kickstand for stabilizing the transporter when unloading or loading. In some implementations, the transporter includes a boom arm configured to drop off and pick up the package. The boom arm operates via an electric motor that causes the boom arm to drop down to pick up a package, raise up to carry the package, and drop down again to drop the package. While the transporter is holding the package, a handle or similar carrying structure of the package can be sandwiched between the boom arm and a clamp to secure the package. The transporter further includes at least one radar or optical sensor, such as LiDAR, and at least one camera positioned on the head. The radar or optical sensor calculates a distance to objects as the distance between the transporter and the object(s) changes. Flange wheels are attached at opposing ends of the collapsible column, with motorized drives for applying torque to the flange wheels. The transporter is transformable among at least a compact mode, a first extended position and a cruise mode. In the compact mode or position, the column is fully collapsed, and the neck is positioned inside rims of the flange wheels. In the first extended position, the column is partially collapsed. In the cruise mode or second extended position, the column and the neck are extended, and the neck extends above the flange wheels.

This device and other implementations of the technology disclosed can include one or more of the following features and/or features described in connection with additional devices, methods and articles of manufacture disclosed. In the interest of conciseness, the combinations of features disclosed in this application are not individually enumerated and are not repeated with each base set of features. The reader will understand how features identified in this section can readily be combined with sets of base features identified as alternative implementations.

The transporter can further include any of several features. It can have a power supply coupled to the motorized drives, such as a battery or solar cell. The handle can be adapted for lifting the transporter, in addition to carrying a package. More generally, the handle could be shelf or basket that carries deliverables. A handle, shelf or bracket can include an anti-theft mechanism that generates one or more of a visual alarm, an audio alarm, and an electroshock. The mudflap incorporates a charging interface for charging the transporter. The charging interface can be conductive, inductive or capacitive. The mudflap can be positioned between the package being transported and the flange wheels. It can prevent the package, such as a sack, from scraping against the wheels.

The transporter can further include a control unit adapted to determine the torque applied to the flange wheels and control the motorized drives. The control unit can include a signal transceiver for receiving a signal controlling the transporter to transport to a designated location. The signal transceiver can report when the transporter arrives at the designated location. The control unit or another component of the transporter can include a navigation system adapted to navigate the transporter during delivery of the package. The transporter can include a facial recognition system adapted to recognize a customer receiving the package.

The flange wheels can have a camber for reducing contact between the flange wheels and ground. They can be covered by a non-pneumatic tire.

The radar is an omni-directional radar or arranged in an array that provides full or substantially full coverage of the transporter's perimeter. Alternatively, an optical sensor such as LiDAR can be used.

Another device disclosed is a depot that interacts with the transporter. The depot includes a shell, a linear actuator vertically aligned within the shell, and at least one mechanical arm attached to and movable along the linear actuator. It can include a second linear actuator and grasper, such as a hook, specialized for deploying and retrieving transporters and loading packages onto transporters, leaving the mechanical arm for fulfilling delivery orders and packaging deliverables. The depot includes a transporter station adapted to store and charge a plurality of transporters within the shell and a control unit for controlling the linear actuator (s) and the mechanical arm and hook. The mechanical arm or the hook, under control by the control unit, is adapted to deploy a transporter down from the shell and to retract the transporter up into the shell.

The depot, in one implementation, has a shell that has a mounting mechanism for attaching the shell to a sidewall. This shell can be made of stainless steel.

The depot services a plurality of transporters, that, as in the first device described in this section, includes a collapsible column, a collapsible neck attached to the collapsible column, the neck supporting a head and a handle for carrying a package, a mudflap attached to the collapsible column for supporting the package, at least one radar and at least one camera positioned on the head, flange wheels attached at opposing ends of the collapsible column, and motorized drives for applying torque to the flange wheels.

The transporters are collapsible for retraction into a depot, where they can be charged. Each of the plurality of transporters is transformable among a compact mode or position, a first extended position and a cruise mode or second extended position. In the compact mode or position, the column is fully collapsed, and the neck is positioned inside rims of the flange wheels. In the first extended position, the column is partially collapsed. In the cruise mode or second extended position, the column and the neck are extended, and the neck extends above the flange wheels.

One of the mechanical arms or graspers, controlled by the control unit, is adapted to deploy a transporter in the first extended position down from the shell, and when the transporter is transformed from the first extended position to the cruise mode, secure the package on the handle for delivery.

The shell height of the depot is in a range of approximately 8 feet to 50 feet and the width in a range of approximately 7 feet to 9 feet. The depth is in a range of approximately 1 foot to 3 feet.

The linear actuator can be a magnetic actuator.

The depot can include infrastructure to connect to an external power supply and an external water supply. It can include a chimney to exhaust hot air. It can include a ventilation system controlled by the control unit and an air inlet and an air outlet positioned on the shell.

At its bottom, the depot can include a sliding door on the shell controlled by the control unit. This door can be part of a so-called airlock, through which transporters are deployed and retracted. Packages also can be loaded onto transporters through the airlock.

Inside the depot, transporters at the transporter station can be arranged in two columns, with the linear actuator vertically aligned in space between columns. The transporter station includes a charging interface that mates with a charging interface of the transporter. The charging interface can be conductive, inductive or capacitive, as described above.

One of the mechanical arms or graspers deploys and retracts the transporter. This can include grasping a handle on the transporter. The mechanical arm or grasper, controlled by the control unit, is adapted to deploy a fully charged transporter identified by the control unit from the plurality of transporters. The control unit in the depot sends a control signal that directs the transporter to transport to a designated location after being deployed from the shell. For instance, to deliver a package to the designated location.

In some implementations, the depot shell includes at least two thermo insulation layers that sandwich a vacuum.

A plurality of modules are assembled or positioned within the depot's shell. The modules can be arranged into two columns separated by a space, with the linear actuator is vertically aligned in the space. The plurality of modules can store inventory, prepare food or beverages, produce fruit or vegetables. A module can include a beverage preparation device, a food preparation device and an indoor vegetable garden. The modules are connected to infrastructure providing electrical power, heat, water and/or light. The modules can include or be connected to a ventilation system controlled by the control unit.

Another method implementation of the technology disclosed is for package delivery, such as hyper-local package delivery. This method includes receiving, over a computer network, an order for delivery of a package to a designated location. A controller or other component of the depot identifies a fully or at least sufficiently charged transporter stored. The depot can be mounted to a sidewall. The method further includes controlling one or more mechanical arms or graspers positioned within the depot to: collect an inventory item stored or product produced within the depot based on the order; position the inventory or product in the package; deploy the transporter out of the depot; and secure the package on the deployed transporter. A loaded, deployed transporter is sent sending a control signal directing the transporter to a designated location.

For some deliveries, the method includes controlling at least one of a beverage preparation device and a food preparation device and controlling the mechanical arm or grasper to prepare the order by loading product from at least one of the beverage preparation device and the food preparation device into the package.

In operation, the method can be extended by, upon receiving a signal from a transporter out of the depot, controlling the mechanical arm or grasper to retract the transporter into the depot. Further, it can include controlling the mechanical arm to position the retracted transporter at a transporter station within the depot for storing and charging the retracted transporter. The depot can include a linear actuator, and the mechanical arm or grasper is attached to and movable along the linear actuator. The mechanical arm or grasper can deploy the transporter out of the depot by grasping a handle of the transporter.

In conjunction with this method the transporter can match any of the descriptions above. It can include: a collapsible column; a collapsible neck attached to the collapsible column, the neck supporting a head and the handle for carrying the package; optionally, a mudflap attached to the collapsible column for supporting the package; a radar or LiDAR and at least one camera positioned on the head; flange wheels assembled at opposing ends of the collapsible column; and motorized drives for applying torque to the flange wheels. Other features described above also can be incorporated into a transporter used in this method.

The method can include the depot's controller sending transformation of the transporter. For instance, directing the charged transporter stored in the depot to transform from the compact mode to the first extended position. Or, controlling the deployed transporter to transform from the first extended position to the cruise mode or second extended position.

One or more features of the implementations disclosed can be combined with any base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

The implementations disclosed may be implemented as a method, apparatus, system or article of manufacture using standard programming or engineering techniques to produce software, firmware, hardware, or any combination thereof. The term "article of manufacture" as used herein refers to code or logic implemented in hardware or stored computer readable media such as optical storage devices, and volatile or non-volatile memory devices. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices. One or more implementations of the technology disclosed, or elements thereof can be implemented in the form of a computer product including a non-transitory computer readable storage medium with computer usable program code for performing the method steps indicated. Furthermore, one or more implementations of the technology disclosed, or elements thereof can be implemented in the form of an apparatus including a memory and at least one processor that is coupled to the memory and operative to perform exemplary method steps. Yet further, in another aspect, one or more implementations of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

The detailed description of some implementations will be better understood when read in conjunction with the appended drawings. To the extent that the figures illustrate diagrams of the functional blocks of various implementations, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like). Similarly, the programs may be standalone programs, may be incorporated as subroutines in an operating system, may be functions in an installed software package, and the like. It should be understood that the various implementations are not limited to the arrangements and instrumentality shown in the drawings.

While the present invention is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A transporter, comprising:
- a collapsible column;
- a collapsible neck attached to the collapsible column, the neck supporting a head and a handle for carrying a package;
- at least one radar or optical sensor and at least one camera positioned on the head;
- flange wheels attached at opposing ends of the collapsible column; and
- motorized drives for applying torque to the flange wheels; wherein
  - the transporter is transformable among at least a compact mode, a first extended position and a cruise mode,
  - in the compact mode, the column is fully collapsed, and the neck is positioned inside rims of the flange wheels,
  - in the first extended position, the column is partially collapsed, and
  - in the cruise mode, the column and the neck are extended, and the neck extends above the flange wheels.

2. The transporter of claim 1, further comprising a power supply coupled to the motorized drives.

3. The transporter of claim 1, further including a kick stand that supports the transporter when not in motion.

4. The transporter of claim 1, further including an optical sensor that determines a distance between the transporter and one or more objects.

5. The transporter of claim 1, further including a boom attached between the neck or column and the handle that pivots between a lowered position that places the package on or near a receiving surface and a raised position against the neck.

6. The transporter of claim 1, wherein the handle includes an anti-theft mechanism adapted to generate at least one of the following:
- a visual alarm,
- an audio alarm, and
- an electroshock.

7. The transporter of claim 1, wherein the handle is further adapted for lifting the transporter.

8. The transporter of claim 1, further comprising a navigation system adapted to navigate the transporter during delivery of the package.

9. The transporter of claim 1, further comprising a facial recognition system adapted to recognize a customer receiving the package.

10. The transporter of claim 1, wherein the flange wheels have camber for reducing contact between the flange wheels and ground.

11. The transporter of claim 1, wherein the radar is an omni-directional radar.

12. The transporter of claim 1, wherein the optical sensor is a LIDAR.

13. The transporter of claim 1, further comprising a signal transceiver for receiving a signal controlling the transporter to transport to a designated location.

14. The transporter of claim 13, wherein the signal transceiver transmits a signal indicating the transporter arrives at the designated location.

15. The transporter of claim 1, further including a mudflap attached to the collapsible column for supporting the package.

16. The transporter of claim 15, wherein the mudflap is positioned between the package and the flange wheels.

17. The transporter of claim 15, wherein the mudflap incorporates a charging interface for charging the transporter.

18. The transporter of claim 17, wherein the charging interface includes at least one of the following:
- a conductive charging interface,
- an inductive charging interface, and
- a capacitive charging interface.

* * * * *